United States Patent
Yoshii et al.

(10) Patent No.: US 7,817,856 B2
(45) Date of Patent: Oct. 19, 2010

(54) VIDEO PROCESSING DEVICE AND ITS METHOD

(75) Inventors: Tsuyoshi Yoshii, Osaka (JP); Yuji Tanikawa, Osaka (JP); Masahiro Okada, Osaka (JP)

(73) Assignee: Panasonic Corporation, Osaka (JP)

( * ) Notice: Subject to any disclaimer, the term of this patent is extended or adjusted under 35 U.S.C. 154(b) by 944 days.

(21) Appl. No.: 11/632,967

(22) PCT Filed: Jul. 15, 2005

(86) PCT No.: PCT/JP2005/013143

§ 371 (c)(1),
(2), (4) Date: Jan. 19, 2007

(87) PCT Pub. No.: WO2006/009105

PCT Pub. Date: Jan. 26, 2006

(65) Prior Publication Data

US 2008/0085051 A1    Apr. 10, 2008

(30) Foreign Application Priority Data

Jul. 20, 2004   (JP)   ............................. 2004-211952

(51) Int. Cl.
*G06K 9/18* (2006.01)
*G06K 9/34* (2006.01)
*H04N 7/00* (2006.01)
*H04N 7/10* (2006.01)
*H04N 7/025* (2006.01)
*H04N 11/00* (2006.01)

(52) U.S. Cl. ...................... 382/182; 382/176; 348/461; 348/465; 348/468; 725/32; 725/137

(58) Field of Classification Search ......... 382/182–187, 382/176, 177; 348/461, 465, 468; 725/32–36, 725/137
See application file for complete search history.

(56) References Cited

U.S. PATENT DOCUMENTS

| | | | | |
|---|---|---|---|---|
| 5,262,860 A * | 11/1993 | Fitzpatrick et al. | .......... | 348/461 |
| 5,546,131 A * | 8/1996 | Terry | .......... | 348/564 |
| 5,859,662 A * | 1/1999 | Cragun et al. | .......... | 725/137 |
| 6,243,419 B1 * | 6/2001 | Satou et al. | .......... | 375/240.13 |
| 6,366,699 B1 * | 4/2002 | Kuwano et al. | .......... | 382/199 |
| 6,501,856 B2 * | 12/2002 | Kuwano et al. | .......... | 382/194 |
| 6,937,766 B1 * | 8/2005 | Wilf et al. | .......... | 382/229 |
| 7,446,817 B2 * | 11/2008 | Jung et al. | .......... | 348/468 |

(Continued)

FOREIGN PATENT DOCUMENTS

JP        62-178666 U      11/1987

(Continued)

*Primary Examiner*—Aaron W Carter
(74) *Attorney, Agent, or Firm*—McDermott Will & Emery LLP

(57) ABSTRACT

A video processing method for selectively processing character information (Ic) included in an inputted video stream (Svc). The video stream (Svc) is separated in units of frame into a brightness frame (Y) representing brightness information (VY) and a plurality of color difference frames (Cb, Cr) representing color difference information (VCb, VCr). Character information (Ic) included according to at least either of the brightness information (VY) and the color difference information (VCb, VCr) is recognized. The recognized character information (Ic) is subjected to a processing by at least one of deletion, movement, and enlargement.

39 Claims, 27 Drawing Sheets

U.S. PATENT DOCUMENTS

| | | | |
|---|---|---|---|
| 7,522,218 B2* | 4/2009 | Lyu | 348/565 |
| 2002/0037104 A1* | 3/2002 | Myers et al. | 382/187 |
| 2002/0085116 A1* | 7/2002 | Kuwano et al. | 348/465 |
| 2003/0193615 A1* | 10/2003 | Unemura | 348/465 |
| 2004/0008277 A1* | 1/2004 | Nagaishi et al. | 348/468 |
| 2004/0017579 A1* | 1/2004 | Lim | 358/1.9 |
| 2005/0196043 A1* | 9/2005 | Jung et al. | 382/176 |
| 2006/0059512 A1* | 3/2006 | Pugel | 725/33 |
| 2007/0085928 A1* | 4/2007 | Sloot | 348/468 |
| 2008/0084502 A1* | 4/2008 | Lee et al. | 348/465 |
| 2008/0187225 A1* | 8/2008 | Katsuyama | 382/190 |
| 2009/0276804 A1* | 11/2009 | Hamada et al. | 725/33 |

FOREIGN PATENT DOCUMENTS

| | | |
|---|---|---|
| JP | 9-200684 A | 7/1997 |
| JP | 2000-350095 A | 12/2000 |
| JP | 2001-136450 A | 5/2001 |
| JP | 2004-23492 A | 1/2004 |

* cited by examiner

VIDEO PROCESSING DEVICE AND ITS METHOD

RELATED APPLICATIONS

This application is the U.S. National Phase under 35 U.S.C. §371 of International Application No. PCT/JP2005/013143 filed on Jul. 15, 2005, which in turn claims the benefit of Japanese Application No. 2004-211952, filed on Jul. 20, 2004, the disclosures of which Applications are incorporated by reference herein.

TECHNICAL FIELD

The present invention relates to a video processing device that extracts or processes character information typified by captions included in video streams such as emergency news in television broadcasts, and its method.

BACKGROUND ART

When a program that is on the air in normal television broadcasting is being recorded, character information such as braking news is sometimes superimposed on the image of the program on the air. In such a case, basically, the user does not want to record the emergency news itself although wanting to record the program. That is, in many cases, the character information such as emergency news included in video streams is unnecessary when recorded streams are watched (that is, after a lapse of time) although it is significant when watched in real time. For users who want to watch video streams intensively, such character information is a hindrance to comfortable video watching.

Therefore, a technology has conventionally been proposed that deletes the character information added to programs on the air. As an example of such a technology, a technology has been proposed such that the broadcasting side inputs an interpolation signal separately from the original video signal in generating a video stream and the receiving side plays back only the video signal from the video stream when necessary (Patent Document 1).

Patent Document 1: Japanese Laid-Open Patent Publication No. H09-200684

DISCLOSURE OF THE INVENTION

Problems to be Solved by the Invention

However, in this method, since the interpolation signal is inserted separately from the video stream in generating the video stream, it is necessary to prepare the interpolation signal prior to the broadcast, so that the object of broadcasting news in response to an emergency substantially cannot be attained. Therefore, a video processing method is required that satisfies conflicting demands that character information can be immediately added to programs on the air also in an emergency and that the character information can be deleted from the images of the character-information-added programs when necessary.

Accordingly, an object of the present invention is to provide a video processing method and its device in which it is unnecessary for the broadcasting side to prepare the interpolation signal separately from the video signal in generating a video stream and the receiving side can generate a video stream desired by users by accurately extracting the character information from the video stream to which teletext is added and performing necessary processings such as deletion and movement.

Solution to the Problems

The present invention is a video processing method of selectively processing character information included in an inputted video stream, the video processing method comprising:

a video stream separating step of separating the video stream into a brightness frame representing brightness information in units of frame and a plurality of color difference frames representing color difference information;

a character recognizing step of recognizing the included character information based on at least either of the brightness information and the brightness information; and a character processing step of performing at least one of deletion, movement, and enlargement on the recognized character information.

EFFECT OF THE INVENTION

By the video processing method according to the present invention, a video stream in which character information is processed can be generated from a video stream including character information such as emergency news. For example, when character information is included in a television program recorded by using a recorder such as a DVD recorder, by applying the present invention to this playback, a video stream from which the character information is deleted can be played back, so that a comfortable watching environment suitable for user demands can be provided.

DESCRIPTION OF THE REFERENCE CHARACTERS

Figure 1:
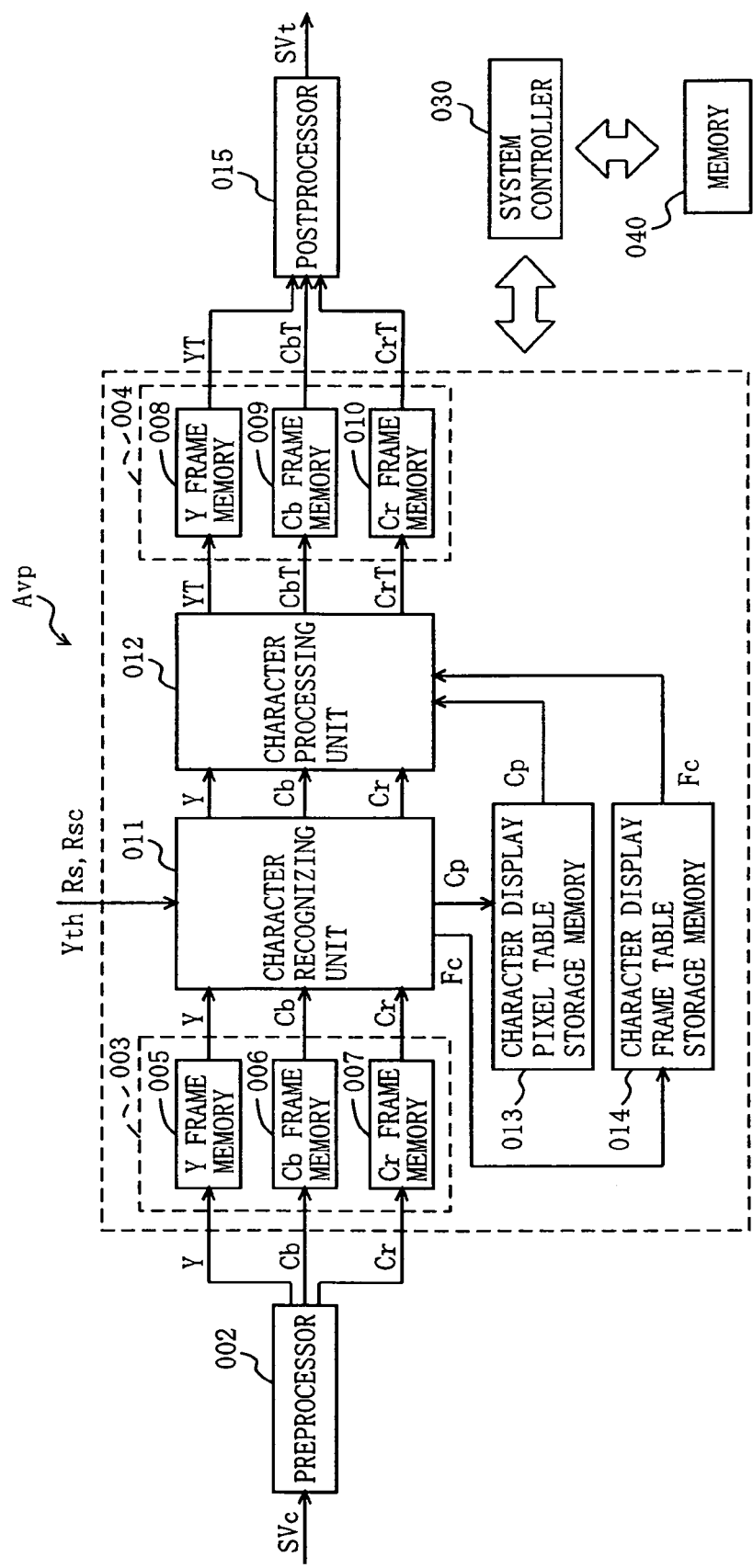
FIG. 1 is a block diagram showing the structure of a video processing device according to an embodiment of the present invention.

Avp video processing device
Ar recording device
Ap playback device
002 preprocessor
003 input memory
004 output memory
005 brightness frame memory
006 color difference Cb frame memory
007 color difference Cr frame memory
008 processed brightness frame memory
009 processed color difference Cb frame memory
010 processed color difference Cr frame memory
011 character recognizing unit
012 character processing unit
013 character display pixel table storage memory
014 character display frame table storage memory
015 postprocessor
016 encoder
017 recording unit
018 recording controller
019 recording medium
020 playback unit
021 displaying unit
022 playback controller
030 system controller
040 memory

BEST MODE FOR CARRYING OUT THE INVENTION

First, referring to FIG. 1, a video processing device according to the present invention will be explained. The video processing device Avp includes a preprocessor 002, an input memory 003, a character recognizing unit 011, a character processing unit 012, a character display pixel table storage memory 013, a character display frame table storage memory 014, an output memory 004, and a postprocessor 015. The video processing device Avp further includes a system controller 030 that controls the overall operation and a memory 040 that stores data necessary for the control.

The preprocessor 002 separates, in units of frame, a video stream Svc in which character information Ic (FIG. 2) is included in the externally inputted original stream Sv (not shown), into a brightness signal Y, a color difference Cb signal, and a color difference Cr, and outputs them to the input memory 003. The brightness signal Y, the color difference Cb signal, and the color difference Cr are shown as Y, Cb, and Cr, respectively, in the figure. The brightness signal Y, the color difference Cb signal, and the color difference Cr signal will be collectively called frame signals.

The input memory 003 is a storage area having a storage capacity capable of storing, when the video processing device Avp processes the frame signal of an arbitrary N-th frame of a video stream, a video stream amount of a predetermined time width before and after the N-th frame. The input memory 003 includes a brightness frame memory 005, a color difference Cb frame memory 006, and a color difference Cr frame memory 007. The brightness signal Y, the color difference Cb signal, and the color difference Cr signal separated by the preprocessor 002 are stored in the brightness frame memory 005, the color difference Cb frame memory 006, and the color difference Cr frame memory 007, respectively.

The character recognizing unit 011 determines whether the character information Ic is included in the brightness signal Y, the color difference Cb signal, and the color difference Cr signal supplied from the brightness frame memory 005, the color difference Cb frame memory 006, and the color difference Cr frame memory 007, respectively. Further, the character recognizing unit 011 recognizes which pixel in the frame is the character pixel representing the character information Ic, generates character pixel coordinate information Cp representing the coordinate position of the character pixel, and outputs it to the character display pixel table storage memory 013. In this specification, for convenience of explanation, pixels constituting the screen image represented by the video stream are called pixels P and pixels representing the character information Ic among the screen pixels are called character pixels Pc for distinction.

The screen image is constituted by an infinite number of pixels arranged in the order of raster scan. Each pixel is distinguished by coordinates (x, y) corresponding to the horizontal position and the vertical position, respectively. That is, when a pixel P and a character pixel Pc are distinguished, they are expressed as a pixel P(x, y) and a character pixel Pc(x, y), respectively. In this specification, when necessary, the pixels P and the character pixels Pc are distinguished like pixels P(x, y) and character pixels Pc(x, y), respectively.

The character display pixel table storage memory 013 further generates the character pixel coordinate information Cp representing, as the character pixel Pc, the pixel P recognized as representing the character information Ic (as at least one of the brightness signal Y, the color difference Cb signal, and the color difference Cr signal), and outputs it to the character display pixel table storage memory 013. The character pixel coordinate information Cp is data representing, so to speak, the coordinates (x, y) of the character pixel Pc in the screen image which coordinates identify the character pixel Pc. That is, by the data of the character pixel Pc(x, y) being stored in the form of a table in the character display pixel table storage memory 013, the character pixel coordinate information Cp can be called a character display pixel table.

The character display frame table storage memory 014 registers the frame where the character information Ic is found, based on the character pixel coordinate information Cp. The character frame information Fc is data constituting a frame table, and in this sense, the character frame information Fc can be called a character display frame table. The character frame information Fc may be one used for the identification of the normal frame such as the frame number. The character recognizing unit 011 outputs the brightness signal Y, the color difference Cb signal, and the color difference Cr signal to the character processing unit 012 after the character recognition processing. The character recognizing unit 011 will be described later in detail with reference to FIG. 2 to FIG. 19.

The character display pixel table storage memory 013 supplies the character pixel coordinate Cp to the character processing unit 012. Likewise, the character display frame table storage memory 014 supplies the character pixel Pc to the character processing unit 012. The character display pixel table storage memory 013 performs processings typified by movement, enlargement, and deletion on the character information components included in the brightness signal Y, the color difference Cb signal, and the color difference Cr signal inputted from the character recognizing unit 011, based on the character pixel coordinate Cp and the character frame information Fc, and then, outputs them to the output memory 004. The brightness signal Y, the color difference Cb signal, and the color difference Cr signal having undergone the processings are distinguished like a processed brightness signal YT, a processed color difference Cb signal CbT, and a processed color difference Cr signal CrT, respectively. In the figure, the signals are shown as YT, CbT, and CrT, respectively. The character display pixel table storage memory 013 will be described later in detail with reference to FIG. 20 to FIG. 25.

The output memory 004 includes a processed brightness frame memory 008, a processed color difference Cb frame memory 009, and a processed color difference Cr frame memory 010 (in the figure, shown as a Y frame memory, a Cb frame memory, and a Cr frame memory, respectively). The output memory 004 is, like the input memory 003, a storage area having a storage capacity capable of storing a video stream amount of a predetermined time width before and after the N-th frame. In the brightness frame memory 005, the color difference Cb frame memory 006, and the processed color difference Cr frame memory 010, the processed brightness signal YT, the processed color difference Cb signal CbT, and the processed color difference Cr signal CrT are temporarily stored, respectively.

The output memory 004 holds the processed brightness signal YT, the color difference Cb signal, and the color difference Cr signal for a predetermined time, and then, outputs them to the post processor 015. The post processor 015 generates a video stream Svt by Y/C-combining the processed brightness signal YT, the processed color difference CbT signal, and the processed color difference CrT signal, and outputs it. A video stream SvY is basically the same as the video stream Svc except that the character information Ic included in the video stream Svc is processed. As described above, when the video stream Svc including the character information Ic is inputted to the video processing device Avp, the video stream Svt where the character information Ic has undergone processings such as movement, enlargement, and deletion is generated and outputted.

Figure 2:
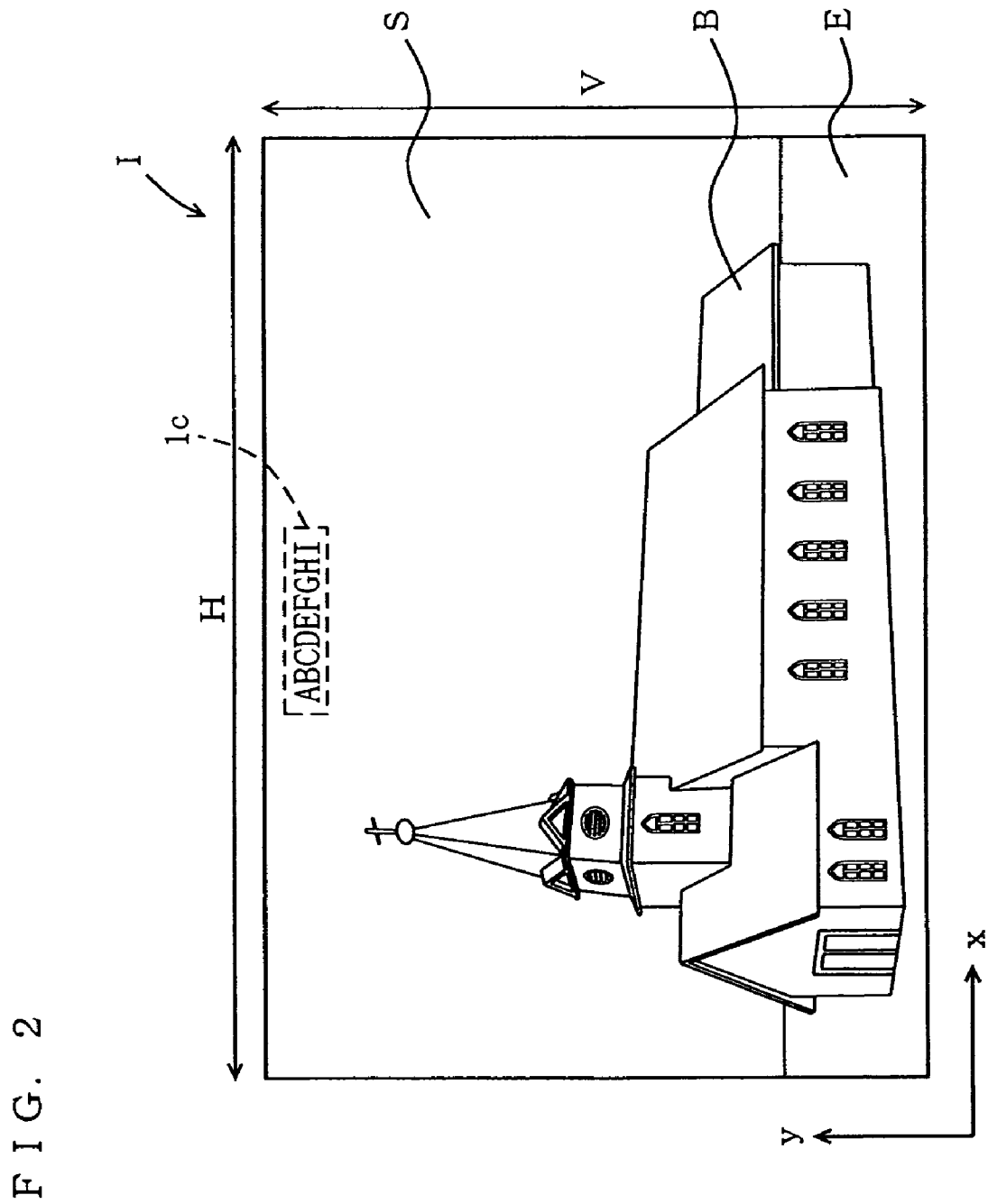
FIG. 2 is a view depicting an example of a frame image of a video stream to be processed in the video processing device shown in FIG. 1.

Next, referring to FIG. 2 to FIG. 19, the character recognizing unit 011 will be explained. An example of the screen image I of an arbitrary N-th frame represented by the video stream Svc is shown in FIG. 2. The screen image I is constituted by H×V pixels P(x, y). H and V are predetermined integral values determined for each standard. x represents the position in the horizontal (H) direction, and y represents the position in the vertical direction.

In this example, most part of the screen image I is constituted by the ground E, a building B, and the sky S. In the part of the sky S in the upper part of the screen image I, "ABCDEFGHI" is displayed. That is, the "ABCDEFGHI" is the character information I included in the video stream Sv, and the image other than the character information Ic is the original stream Sv. That is, the character recognizing unit 011 recognizes the "ABCDEFGHI" (character information Ic) included in each frame of the video stream Svc. In this example, the pixels Prepresenting "ABCDEFGHI" are the character pixels Pc.

Figure 3:
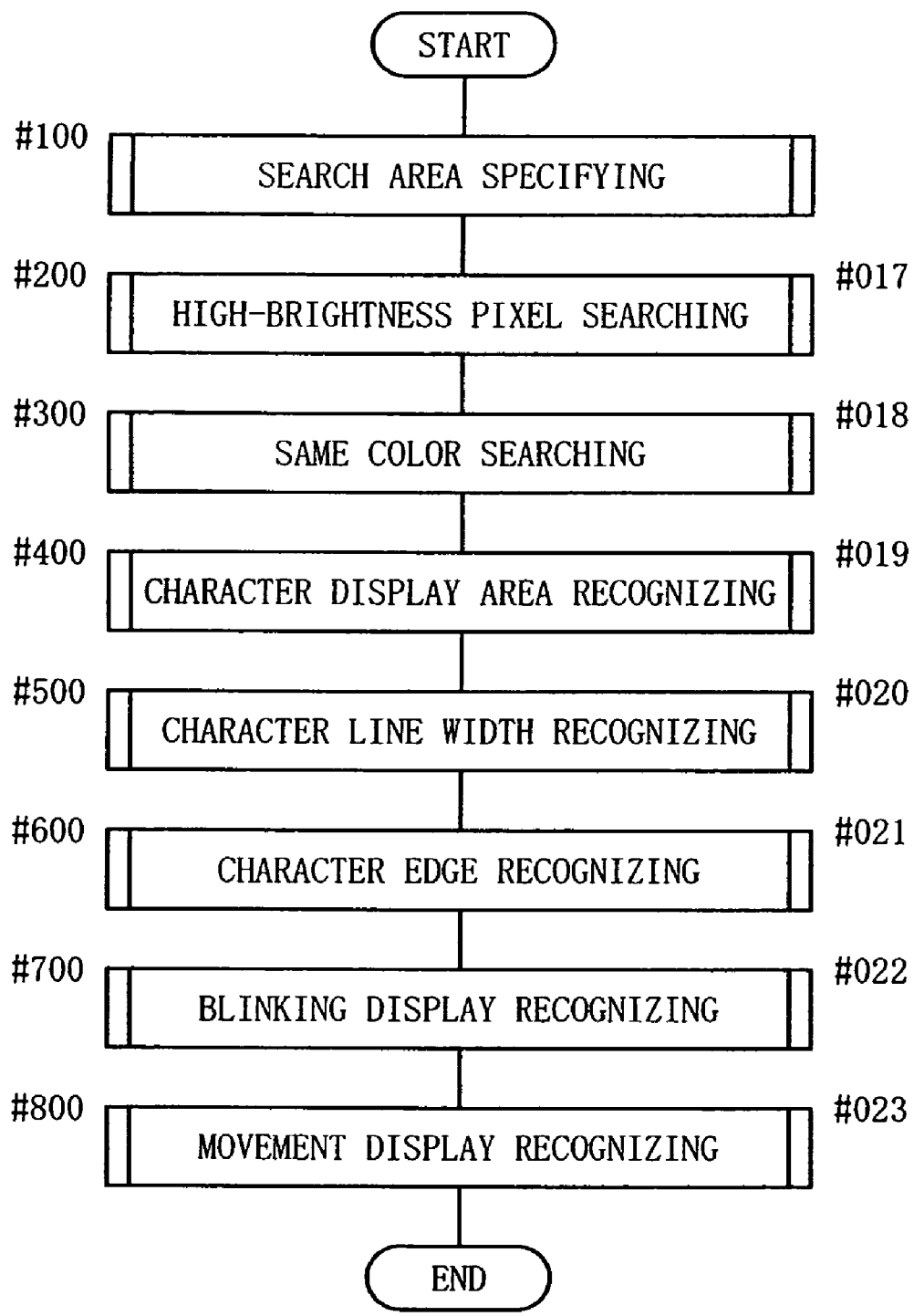
FIG. 3 is a flowchart depicting the principal character recognition operation of the video processing device shown in FIG. 1.

A flowchart depicting the character recognition operation of the character recognizing unit 011 is shown in FIG. 3. The character recognition by the character recognizing unit 011 includes a search area specifying subroutine #100, a high-brightness pixel searching subroutine #200, a same color searching subroutine #300, a character display area recognizing subroutine #400, a character line width recognizing subroutine #500, a character edge recognizing subroutine #600, a blinking display recognizing subroutine #700, and a moving display recognizing subroutine #800.

The character recognition operation is started at the point of time when the brightness signal Y, the color difference Cb signal, and the color difference Cr signal which are frame signals of the video stream Svc Y/C-separated by the preprocessor 002 are inputted to the character recognizing unit 011.

First, in the search area specifying subroutine #100, the search area of the character information Ic on the screen is prespecified. Generally, the character information Ic such as emergency news is frequently displayed at an end at the top, the bottom, the right or the left of the screen. Therefore, by limiting the search area Rs which is the object area of the search for the character information Ic, to an arbitrary area in the screen image I, the erroneous detection of the character information Ic is reduced. In the screen image I illustrated in FIG. 2, since the character information Ic is displayed in an upper part of the screen, the search area Rs is set in the upper part of the screen.

Figure 4:
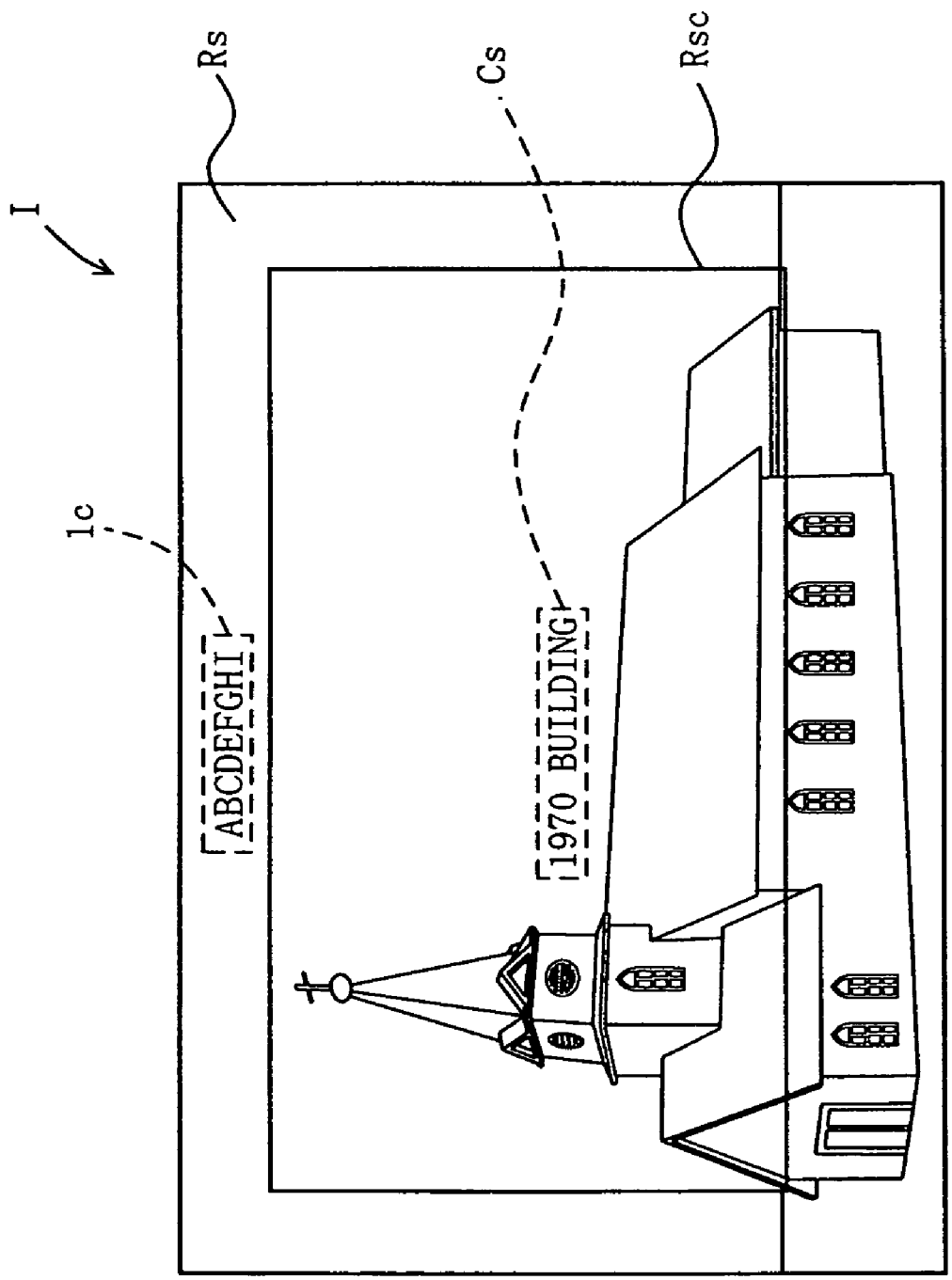
FIG. 4 is an explanatory view of the search area specification in a search area specifying subroutine shown in FIG. 3.

Next, referring to FIG. 4, the search area Rs when character information is also included in the original video stream separately from the character information Ic included in the video stream Svc afterward will be explained. While the screen image I shown in FIG. 4 is similar to the screen image I shown in FIG. 3, letters "1970 BUILDING" are displayed as an explanation of the displayed building B also in the part of the sky S in the center of the image. The "1970 BUILDING" is a caption Cs for the explanation of the image, and is not the character information Ic included in the video stream Sv. As shown in the figure, the caption Cs is frequently displayed in a position different from the position of the character information Ic for the explanation of the image. While the character information Ic is displayed in an upper part of the screen in the examples shown in FIG. 2 and FIG. 4, in the case of subtitles of films, it is frequently displayed in a lower part of the image. In any case, the character information Ic included in the video stream Sv afterward is frequently displayed in a part of the screen image I that does not spoil the intention of the creator of the image as much as possible.

As described above, when there is a possibility that the character information Ic and the caption Cs are intermingled and it is difficult to identify where the character information Ic is present, the area where the character information Ic cannot be present is specified as a non-search area Rsc instead of specifying the search area Rs. Consequently, although inferior to when the search area Rs is specified, the load on the character recognition processing is reduced, and the probability of erroneous detection of the character information Ic can be prevented, or erroneous detection can be prevented. That is, even if the specification of the search area Rs or the non-search area Rsc is not performed, the presence or absence of this subroutine does not affect the character recognition processing except for the increase in processing load and the increase in the probability of erroneous detection of the character information Ic.

Figure 5:
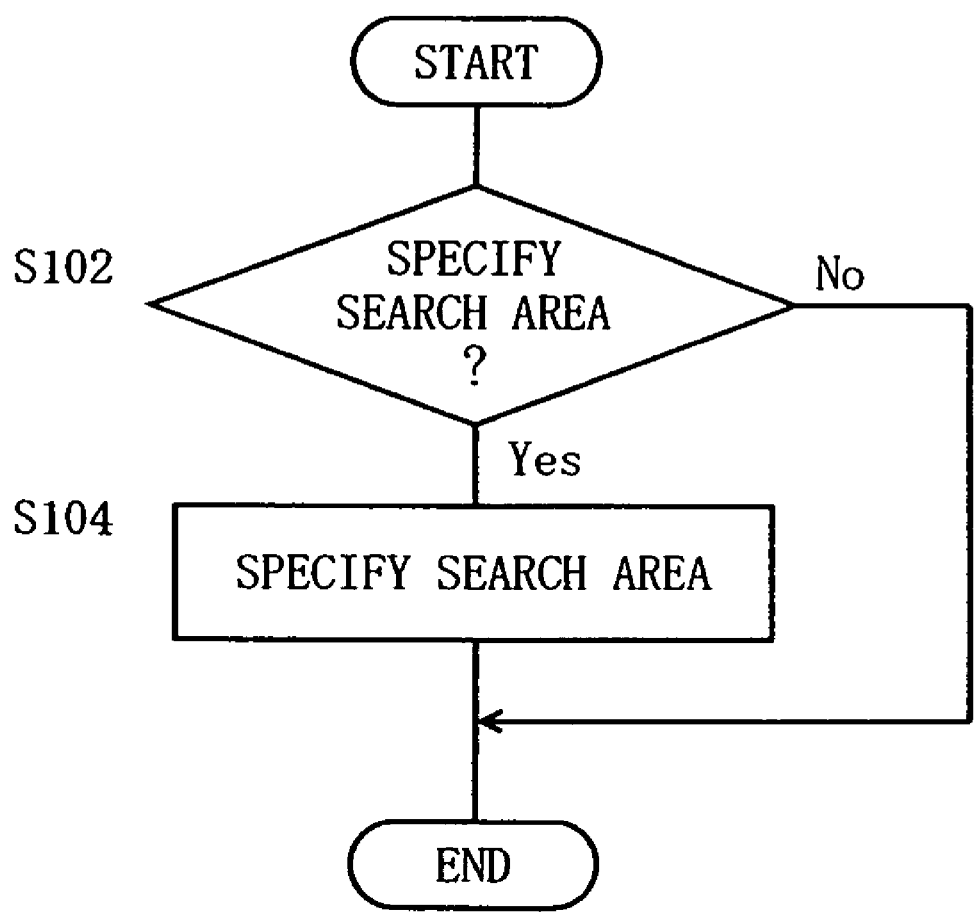
FIG. 5 is a flowchart depicting the operation in the search area specifying subroutine shown in FIG. 3.

Referring to FIG. 5, details of the operation in the search area specifying subroutine #100 will be explained. In the search area specifying subroutine #100, first, at step S102, whether either the search area Rs which is the area searched for the character pixel Pc or the non-search area Rsc not searched for the character pixel Pc is set for the inputted video stream Svc is inquired of the user. To make this inquiry, a message may be displayed on the monitor (not shown) that displays the image of the video stream Svc such as a television, or a voice may be used. To this inquiry, the user inputs a reply of Yes or No by using input means such as a remote control unit or a mouse. When the user inputs Yes, the control proceeds to the next step S104.

At step S104, the user specifies the search area Rs or the non-search area Rsc. Preferably, the user specifies the search area Rs or the non-search area Rsc by using input means such as a mouse on the screen image I of the video stream Svc displayed on the monitor. The specified search area Rs or non-search area Rsc is inputted to the character recognizing unit 011 as information representing a set of coordinates (x, y) of the pixels P constituting the image. Then, the search area specifying subroutine #100 is ended. When the user's reply is No at step S102, the control skips the step S104 described above, and the search area specifying subroutine #100 is ended.

Figure 6:
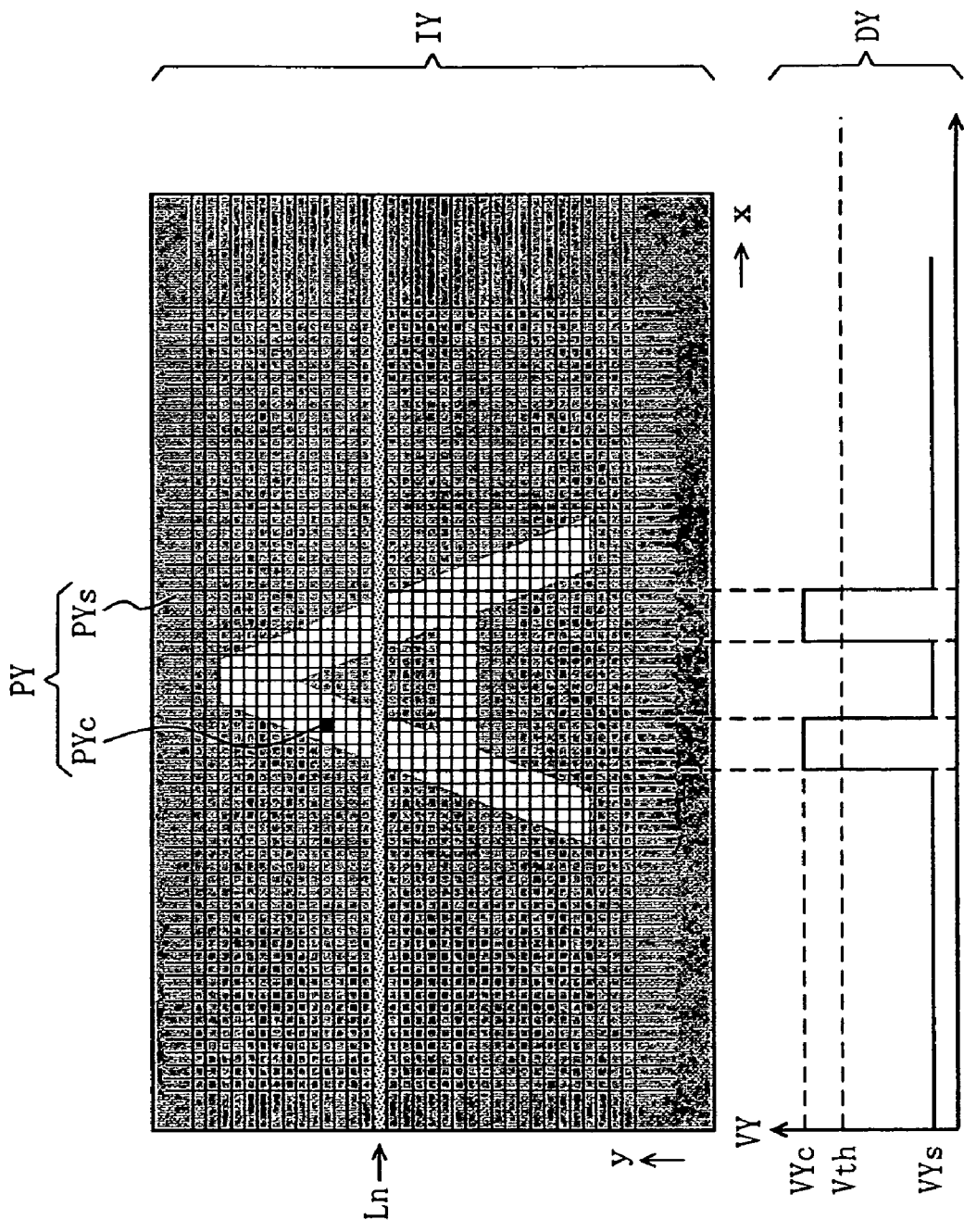
FIG. 6 is an explanatory view of the high brightness search in the high-brightness searching subroutine shown in FIG. 3.

Next, referring to FIG. 6, the operation in the high-brightness pixel searching subroutine #200 will be explained. In the high-brightness pixel searching subroutine #200, for the character information Ic such as emergency news, generally, the pixels displaying the character information Ic are extracted based on characteristics displayed in high brightness on the screen. In FIG. 6, a brightness screen image IY of a part including "A" of the character information Ic of the image of FIG. 4 which is the brightness signal Y stored in the input brightness Y frame memory 005 is shown so as to be partially enlarged, and the brightness distribution DY on a horizontal line Ln of the brightness screen image IY is shown. The brightness screen image IY is constituted by H×V brightness pixels PY(x, y). In FIG. 6, each square represents a brightness pixel PY(x, y). The brightness pixels PY(x, y) will be called merely brightness pixels PY when it is unnecessary to distinguish them from one another.

In the brightness distribution DY, the longitudinal axis represents the brightness VY of the brightness pixels PY(x, y) on the line Ln, and the lateral axis represents the brightness pixels PY(x, y) on the line Ln. For convenience of explanation, when necessary, in the brightness screen image IY, the brightness pixels PY displaying the character information Ic are called character brightness pixels PYc and the pixels displaying the stream Sv are called stream brightness pixels PYs for distinction. Likewise, the brightnesses VY of the character brightness pixels PYc and the stream brightness pixel PYs are distinguished like the character brightness VYc and the stream brightness VYs, respectively.

In this example, the line Ln crosses above the "A" of the character information Ic. As described above, in the brightness screen image IY, the character brightness VYc of the character brightness pixels PYc constituting the character of the character information Ic is higher than the stream brightness VYs of the stream brightness pixels PYs displaying the video stream Sv. Therefore, in the present invention, a brightness threshold value Vth to make a distinction between the character brightness VYc and the stream brightness VYs is preset, and extracts, as the character brightness PYc, the brightness pixel PY having a brightness VY higher than the brightness threshold value Vth. The comparison of the brightness VY of the brightness pixels PY(x, y) constituting the brightness screen image IY with the predetermined brightness threshold value Vth is preferably performed in the order of raster scan.

That is, in the high-brightness pixel searching subroutine #200, the extraction of the character brightness PYc is performed on all the pixels P within the search area determined in the search area specifying subroutine #100. The character pixel coordinate information Cp representing the coordinates (x, y) of the character brightness pixel PYc extracted as the character information Ic is generated. Then, the character display pixel table storage memory 013 registers the coordinates (x, y) of the extracted character brightness pixel PYc based on the character pixel coordinate information Cp. Moreover, the character frame information Fc representing the frame where the character brightness pixel PYc is extracted is generated. The character display frame table storage memory 014 registers the frame where the character brightness pixel PYc is extracted, based on the character frame information Fc. In other words, the character pixel coordinate information Cp is stored in the character display pixel table storage memory 013, and the character frame information Fc is stored in the character display frame table storage memory 014.

Figure 7:
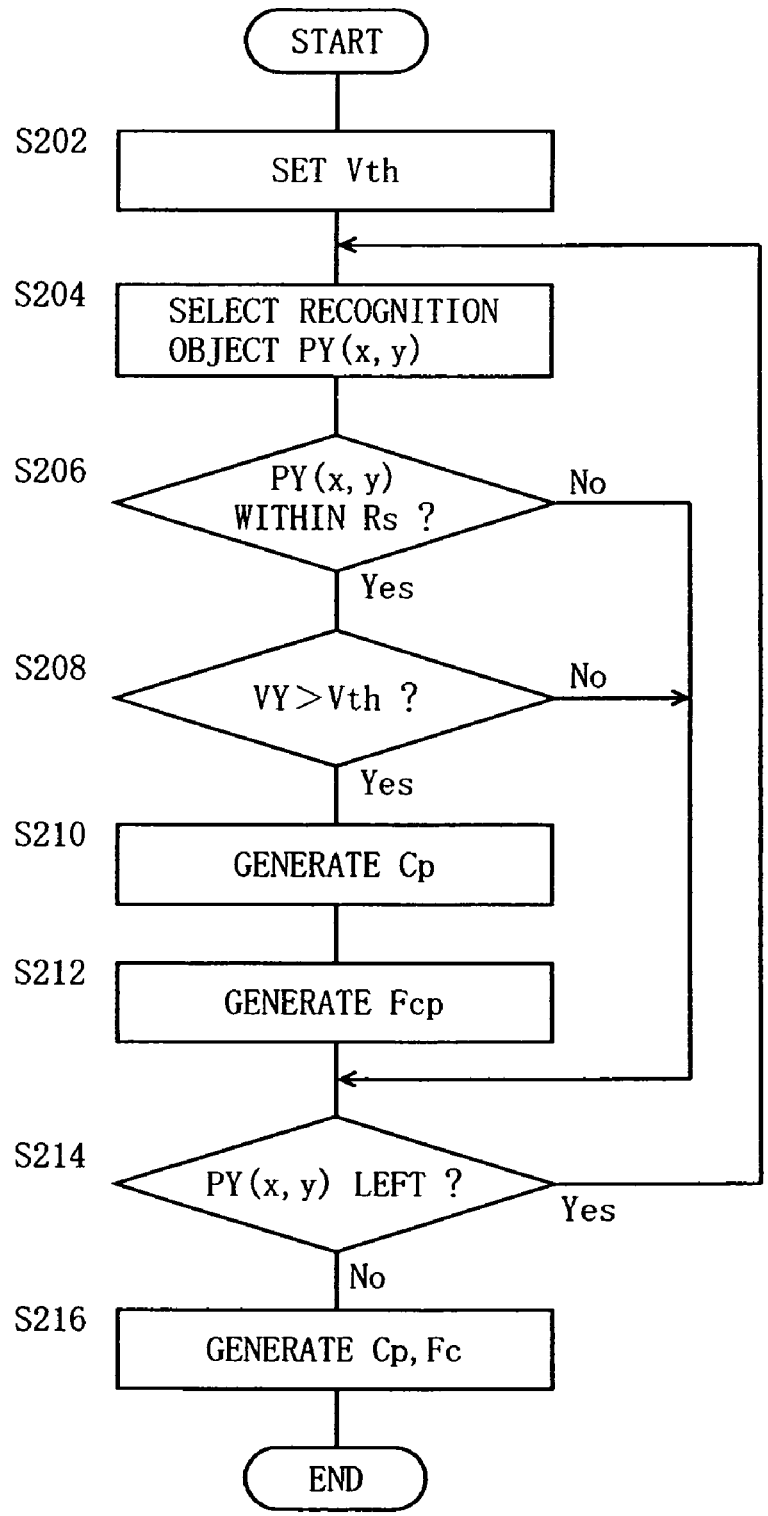
FIG. 7 is a flowchart depicting the operation in a character recognizing subroutine shown in FIG. 3.

Next, referring to FIG. 7, the operation in the high-brightness pixel searching subroutine #200 will be explained in detail. When the high-brightness pixel searching subroutine #200 is started, first, at step S202, the brightness threshold value Vth is set. Preferably, the user inputs an appropriate value by using input means such as a remote control unit. However, the brightness threshold value Vth may be supplied from means for storing predetermined brightness threshold values Vth in the combination of the kind of the video stream Svc and the kind of the character information Ic (FIG. 1). Then, the control proceeds to the next step S204.

At step S204, the order is determined in which the character brightness pixel detection processing to determine whether the brightness pixel PY(x, y) is the character brightness pixel PYc is performed on all the brightness pixels PY(x, y) of the brightness signal Y of the video stream Svc, and the brightness pixels PY(x, y) on which the processing is to be performed in the determined order are selected one by one. Preferably, the values of x and y are counted up in the order of raster scan every time the character brightness pixel detection processing is ended for each selected brightness pixel PY(x, y), and the object of search is updated. Then, the control proceeds to the next step S206.

At step S206, the coordinate values (x, y) of the brightness pixel PY (x, y) are compared with the coordinate values (x, y) representing the search range Rs or the non-search area Rsc specified at the step S104 described above to determine whether the brightness pixel PY is within the search area Rs or the non-search area Rsc. When the result is Yes, the control proceeds to the next step S208.

At step S208, whether the brightness VY of the brightness pixel PY(x, y) is higher than the brightness threshold value Vth is determined. When the result is Yes, that is, when it is determined that the brightness pixel PY(x, y) is the character brightness pixel PYc, the control proceeds to the next step S210.

At step S210, the character pixel coordinate information Cp is generated based on the coordinates (x, y) of the brightness pixel PY(x, y) determined to be the character brightness pixel PYc. Then, the control proceeds to the next step S212.

At step S212, the character frame information Fc is generated based on the identifier of the frame including the brightness pixel PY(x, y) determined to be the character brightness pixel PYc. Then, the control proceeds to the next step S214.

When the result of the determination is No at the step S206 and step S208 described above, the control skips the processings of steps S208, S210, and S212, and directly proceeds to step S214.

At step S214, it is determined whether, of all the brightness pixels PY(x, y) set as the objects of search, one on which search is not performed is left. Specifically, it is determined whether the values of the x and y coordinates of the brightness pixel PY which is the current object of search are lower than the maximum values set at step S204. When the result is Yes, the control returns to step S204, and the next brightness pixel PY in the order of raster scan is selected. Thereafter, the processing is repeated until the result of the determination is No at this step.

When the result is Yes at step S214, that is, when the recognition of the character brightness pixel PYc is completed for the brightness signal Y of the current frame, the control proceeds to the next step S216.

At step S216, the character pixel coordinate information Cp representing the recognized character brightness pixel PYc and the character frame information Fc generated for all the brightness pixels PY at step S210 and step S212 are recorded in the character display pixel table storage memory 013 and the character display frame table storage memory 014, respectively. That is, the character brightness pixel PYc is registered in the character display pixel table storage memory 013, and its frame is registered in the character display frame table storage memory 014. Then, the high-brightness pixel searching subroutine #200 is ended, and the control proceeds to the same color searching subroutine #300.

Instead of completing and registering the character pixel coordinate information Cp and the character frame information Fc after the character brightness pixel detection processing on all the brightness pixels PY of the frame is completed as described above, the character brightness pixel PYc may be registered in the character display pixel table storage memory 013 and the character display frame table storage memory 014 as the character coordinate information Cp and the character frame information Fc every time the character brightness pixel PYc is detected.

In the same color searching subroutine #300, generally, the recognition accuracy of the character information Ic such as emergency news is increased based on the characteristic displayed in the same color by applying a filter called the same color (the degree of the color difference) to the character brightness pixel PYc detected based on the brightness threshold value Vth in the high-brightness pixel searching subroutine #200. In the present invention, whether the colors are the same is determined in a similar manner both when the determination is based on the color difference Cb signal and when it is based on the color difference Cr signal. Therefore, to avoid redundancy, in this specification, an explanation based on the color difference Cb signal is given, and an explanation based on the color difference Cr signal is omitted.

Figure 8:
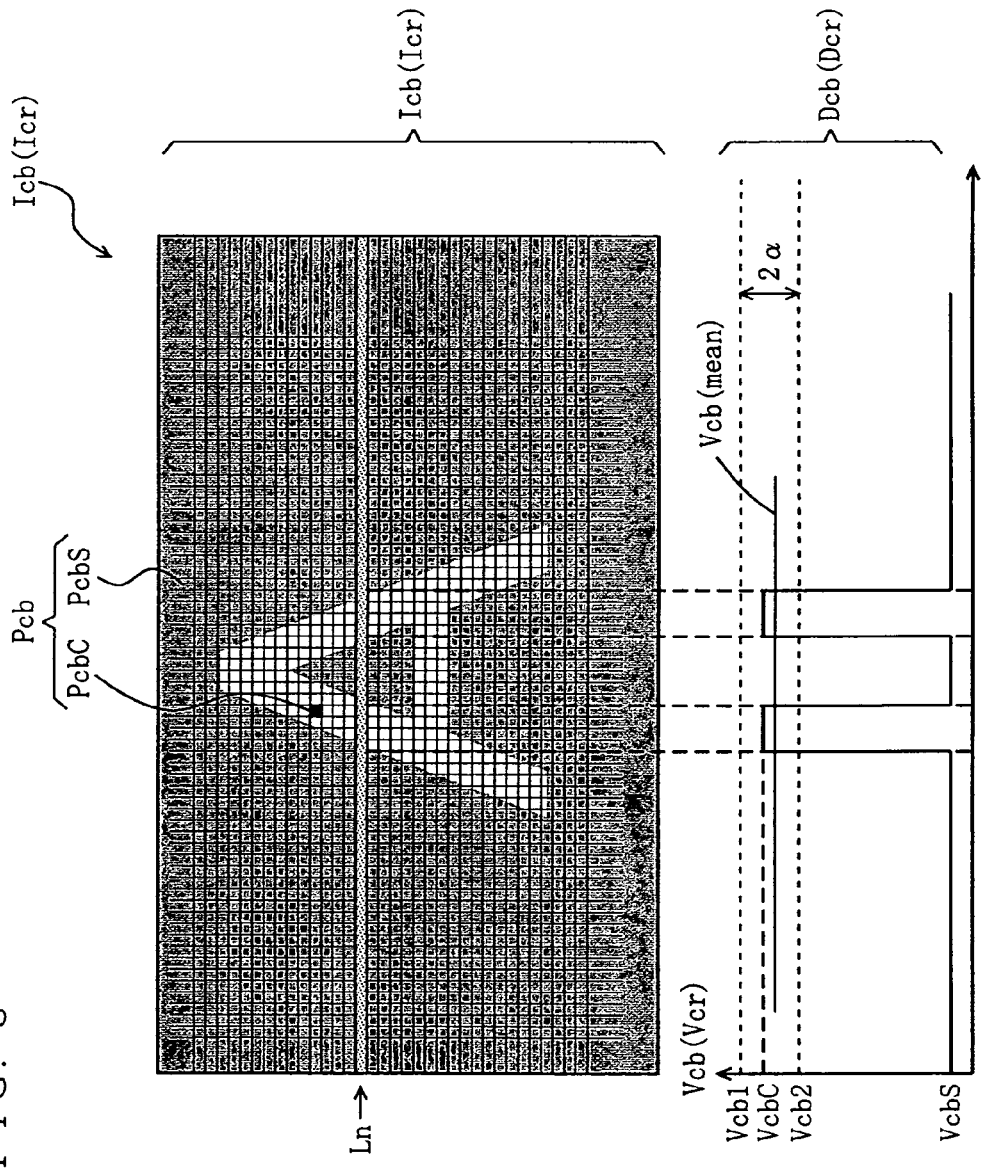
FIG. 8 is an explanatory view of the same color search in a same color searching subroutine shown in FIG. 3.

Referring to FIG. 8, the process of the same color searching subroutine #300 will be concretely explained. In FIG. 8, a color difference Cb screen image Icb of a part including "A" of the character information Ic of the image of FIG. 4 which is the color difference Cb signal stored in the color difference Cb frame memory 006 is shown so as to be enlarged, and the color difference Cb distribution Dcb on the horizontal line Ln of the color difference Cb screen image Icb is shown.

The color difference Cb screen image Icb is constituted similarly to the brightness screen image IY except that the signal on which it is based is the color difference Cb signal. That is, in the color difference Cb screen image Icb, each square represents a color difference Cb pixel Pcb(x, y) of the color difference Cb screen image Icb. x and y represents the coordinate in the horizontal direction and the coordinate in the vertical direction in the color difference Cb screen image Icb, respectively.

In the color difference Cb distribution Dcb, the longitudinal axis represents the color difference Cb value Vcb of the color Cb pixel Pcb(x, y) on the line Ln, and the lateral axis represents the color difference Cb pixel Pcb(x, y) on the line Ln. For convenience of explanation, when necessary, the color difference Cb pixels displaying the character information Ic are called color difference Cb character pixels PcbC and the color difference Cb pixels displaying the stream Sv are called color difference Cb stream pixels PcbS for distinction, and these are collectively called the color difference Cb pixels PCb. Likewise, the color difference values Vcb of the color difference Cb character pixels PcbC and the color difference Cb stream pixels PCbS are called character color difference Cb values VcbC and stream color difference Cb values VcbS, respectively, for distinction.

In this example, the line Ln crosses upper part of the "A" of the character information Ic. If the character information Ic is displayed in the same color, the average value of the color difference Cb values VcbC of the color difference Cb pixels Pcb corresponding to the character brightness pixels PYc registered at step #200 have substantially a similar value to that of the character display color. Therefore, since the character display color should be within the range of the average value of the Cb color difference values Vcb of all the color difference Cb pixels Pcb registered in the high-brightness pixel searching subroutine #200±an error α, the registration of the character brightness pixels PYx(x, y) corresponding to the color difference Cb pixels Pcb(x, y) outside this range are deleted from the character display pixel table storage memory 013. α is an arbitrary permissible amount, and appropriately determined with respect to the inputted video stream Svc and the video processing device Avp. In this manner, the recognition accuracy of the character information Ic based on the detection of the character brightness pixel PYc by the high-brightness pixel searching subroutine #200 is improved. However, the processing of the high-brightness pixel searching subroutine #200 is not indispensable to the recognition of the character information Ic in the present invention.

Figure 9:
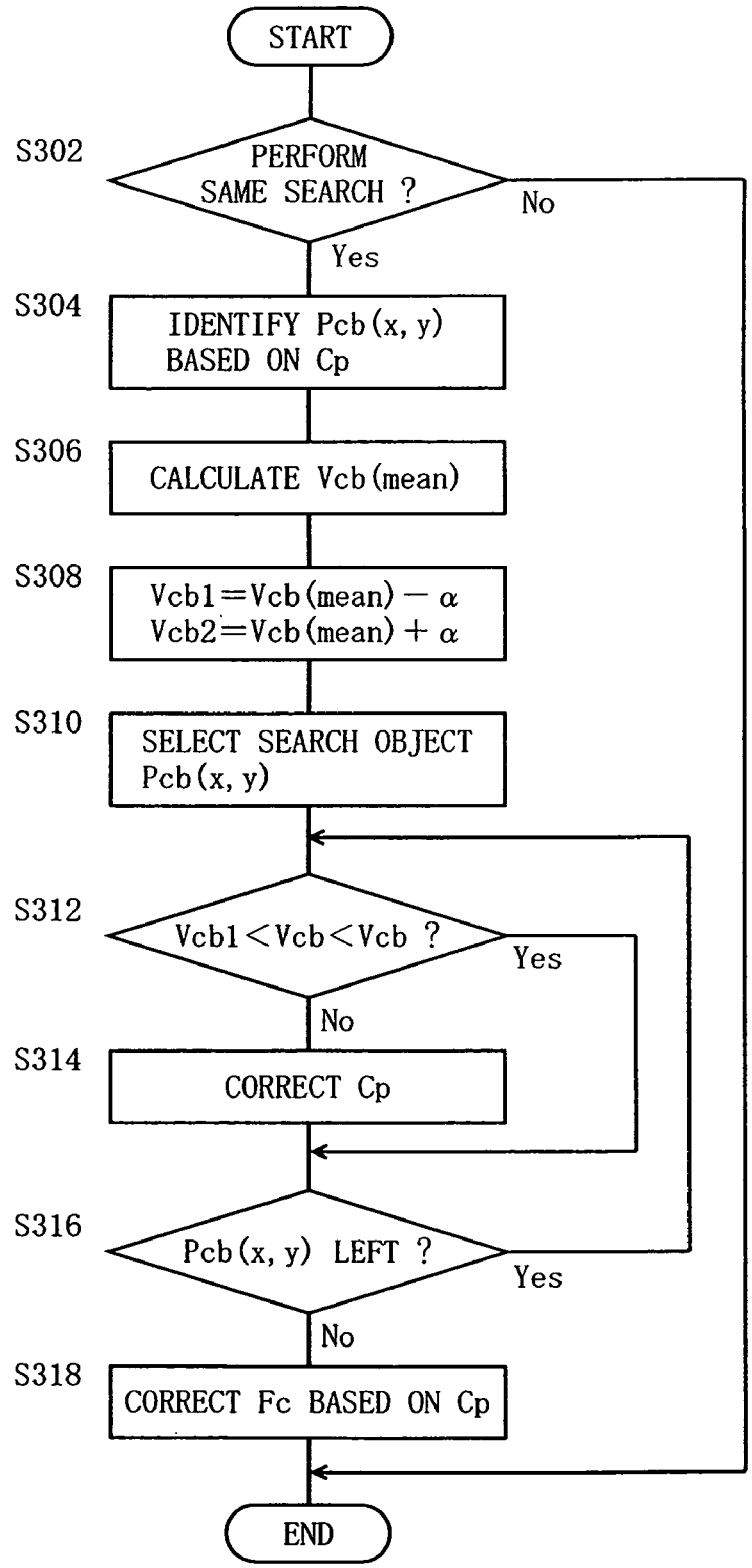
FIG. 9 is a flowchart depicting the same color searching subroutine operation shown in FIG. 3.

Next, referring to FIG. 9, the operation in the same color searching subroutine #300 will be explained in detail with a color difference Cb frame image as an example. An explanation of the operation in the case of a color difference Cr frame image is omitted because it is similar to that in the case of the color difference Cb frame image.

When the same color searching subroutine #300 is started, first, at step S302, whether to perform the same color search is determined. Preferably, to the user, a message "perform the same color search?" is displayed on the monitor so that the user responds to the message by using input means such as a remote control unit. However, it may be predetermined whether to perform the same color search in the combination of the kind of the video stream Svc and the kind of the character information Ic. Then, the control proceeds to the next step S304.

At step S304, the character pixel coordinate information Cp is read from the character display pixel table storage memory 013, and in the color difference Cb screen image Icb, the color difference Cb pixel Pcb(x, y) corresponding to a character pixel Pc brightness signal Y (x, y) recorded in the character coordinate information Cp are identified. Then, the control proceeds to the next step S306.

At step S306, the Cb color difference values Vcb of all the identified color difference Cb pixels Pcb (x, y) are detected. Then, the average Cb color difference value Vcb(mean) which is the average value of the detected Cb color difference values Vcb is calculated. Then, the control proceeds to the next step S308.

At step S308, based on the error α, two same color difference Cb threshold values Vcb1 and Vcv2 are generated according to the following expressions (1) and (2):

$$Vcb1 = Vcb(\text{mean}) - \alpha \quad (1)$$

$$Vcb2 = Vcb(\text{mean}) + \alpha \quad (2)$$

Then, the control proceeds to the next step S310.

At step S310, the order is determined in which the same color determination processing to determine whether the colors are the same is performed on all the color difference Cb pixels Pcb identified at step S304, and the color difference Cb pixels Pcb(x, y) are selected one by one in the determined order. Preferably, the values of x and y are counted up in the order of raster scan every time the same color search determination processing is ended for each set color difference Cb pixel Pcb(x, y), and the object of search is selected. Then, the control proceeds to the next step S312.

At step S312, it is determined whether the Cb color difference value Vcb of the color difference Cb pixel Pcb(x, y) selected at step S310 is higher than the same color difference Cb threshold value Vcb1 and lower than the same color difference Cb threshold value Vcb2. When the result is No, that is, when it is determined that the color difference Cb pixel Pcb(x, y) is not the color difference Cb character pixel PcbC representing the character information Ic, the control proceeds to the next step S314.

At step S314, the character pixel coordinate information Cp is corrected. Specifically, the character pixel coordinate information Cp is corrected so that the (x, y) coordinates of the character brightness pixel PYc corresponding to the color difference Cb pixel Pcb(x, y) determined not to be the color difference Cb character pixel PcbC at step S312 from character pixel coordinate information Cp is deleted from the character pixel coordinate information Cp. Then, the control proceeds to the next step S316.

At step S316, it is determined whether, of all the color difference Cb pixels Pcb(x, y) identified as the objects of search at step S304, one on which search is not performed is left. Specifically, it is determined whether the values of the (x, y) coordinates of the color difference Cb pixel Pcb which is the current object of search are lower than the maximum values set at step S304. When the result is Yes, the control returns to step S312, and the next color difference Cb pixel Pcb(x, y) in the order of raster scan is selected. Thereafter, the processing is repeated until the result of the determination is No at this step.

When the result at step S316 is Yes, that is, when the same color search processing on the color difference Cb signal of the current frame is completed, the control proceeds to the next step S318.

At step S318, when necessary, the character frame information Fc is corrected based on the character pixel coordinate information Cp corrected at step S316. Specifically, when the character brightness pixel PYc included in the frame registered in the character frame information Fc comes not to be registered in the character pixel coordinate information Cp because of the deletion of the character brightness pixel PYc corresponding to the color difference Cb pixel Pcb(x, y) determined not to be the color difference Cb character pixel PcbC, the registration of the frame is deleted from the character frame information Fc. Then, the processing of the same color searching subroutine #300 is ended.

When the result of the determination is No at the step S302 described above, skipping the steps S302 to S318 described above, that is, without executing the same color determination processing in the same color searching subroutine #300, the control proceeds to the next character display recognizing subroutine #400.

When the result at step S312 is Yes, that is, when it is determined that the color difference Cb pixel Pcb(x, y) is the color difference Cb character pixel PcbC, the control skips step S314 to correct the character pixel coordinate information Cp, and proceeds to step S316. Then, by way of step S318, the control ends the processing of the same color searching subroutine #300, and proceeds to the character display area recognizing subroutine #400.

The character display area recognizing subroutine #400 is to further improve the recognition accuracy of the character information Ic based on the characteristic that the character information Ic such as emergency news is, generally, densely displayed in a limited area on the screen. To be brief, in the processing, of the pixels P detected as the character pixels Pc, pixels that are present in positions relatively away from the other character pixels Pc are extracted, and their registration as character pixels is deleted from the character pixel coordinate information Cp. The character pixel Pc referred to here may be any one of the character brightness pixel PYc registered in the high-brightness pixel searching subroutine #200 and the color difference Cb character pixel PcbC registered in the same color searching subroutine #300.

Therefore, hereinafter, when limitation to the kind of the object character pixel Pc is not particularly necessary, explanation will be given while the pixels P representing the character information Ic registered in the character display pixel table storage memory 013 are all collectively called character pixels Pc. That is, in this example, the character brightness pixels PYc and the color difference Cb character pixels PcbC (PcrC) registered in the character display pixel table storage memory 013 are collectively called character pixels Pc.

Figure 10:
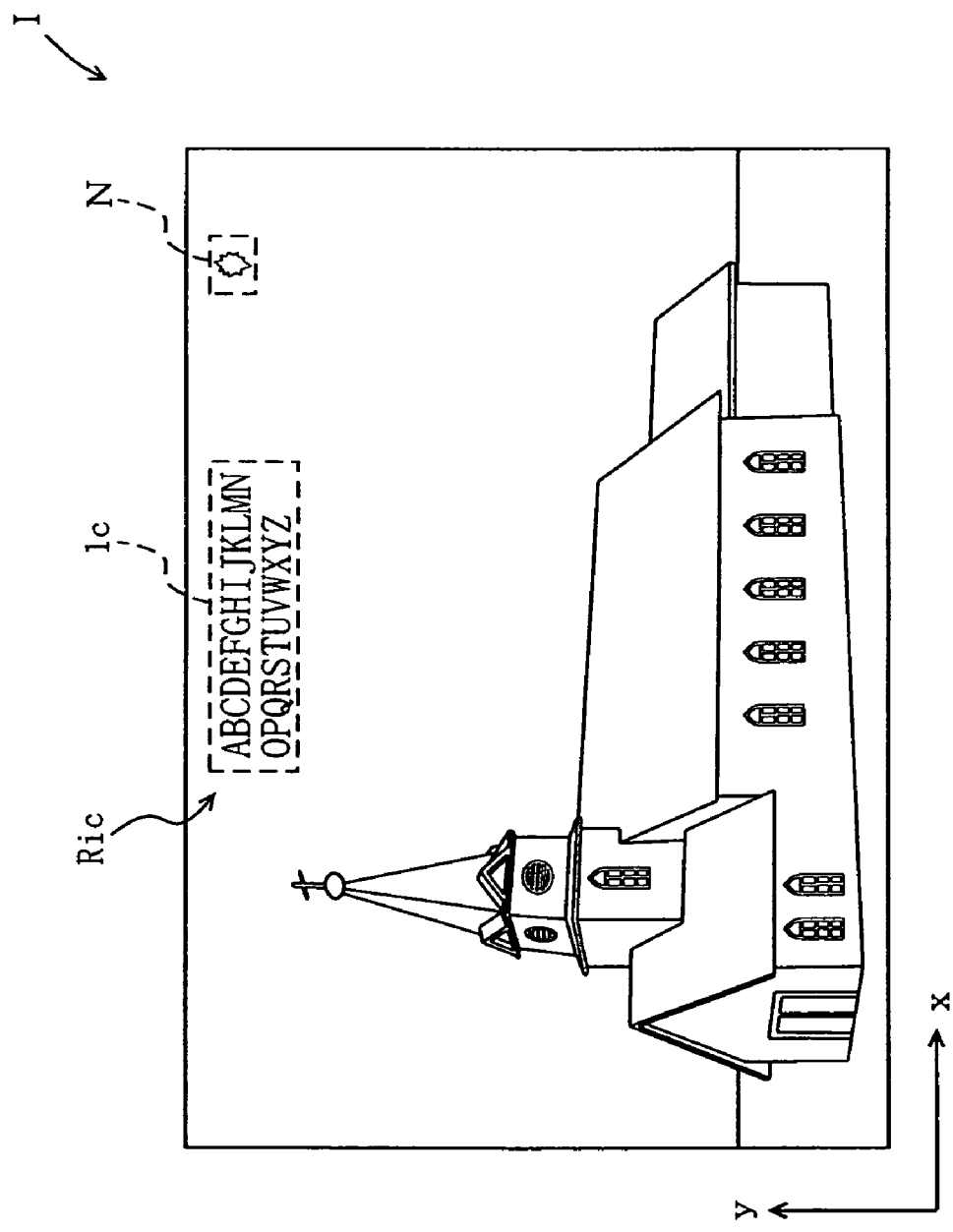
FIG. 10 is an explanatory view of the character display area recognition in a character display area recognizing subroutine shown in FIG. 3.

Referring to FIG. 10, the basic idea of the processing in the character display area recognizing subroutine #400 will be explained. FIG. 10 is basically the same as the screen image I illustrated in FIG. 2 except that the character information Ic is not "ABCDEFGHI" but "ABCDEFGHIJKLMN" and "OPQRSTUVWXYZ" are displayed in two lines and that a noise N is displayed. The area where the character information Ic is displayed will be called a character display area Ric. In such a screen image I, when the brightness VY of the noise N is higher than the brightness threshold value Vth (Yes at step S208) and when the Cb color difference value Vcb and the Cr color difference value Vcr are within the range of a predetermined threshold value (Yes at step S312), the noise N is erroneously recognized as the character information Ic.

That is, the pixels P constituting the noise N are erroneously registered in any one of the character display pixel table storage memory 013 and the character display frame table storage memory 014 or both. In the character display area recognizing subroutine #400, such erroneous recognition is prevented in the following manner:

The noise N and the character information Ic are distinguished in the following manner: The sum total "L" of the distances between one of all the character pixels Pc (the character brightness pixels PYc, the color difference Cb character pixels PcbC) registered in the character display pixel table storage memory 013 and all the other character pixels Pc is calculated. This L will be called a from-other-pixel total distance L of each character pixel Pc. How far the position where a specific character pixel Pc is displayed is from the character display area Ric is determined based on the from-other-pixel total distance L. Then, the character pixel Pc having a from-other-pixel total distance L extremely larger than the average from-other-pixel total distance L(mean) which is the average value of the from-other-pixel total distances L is deleted from the character frame information Fc stored in the character display pixel table storage memory 013 as being not representing the character information Ic.

Figure 11:
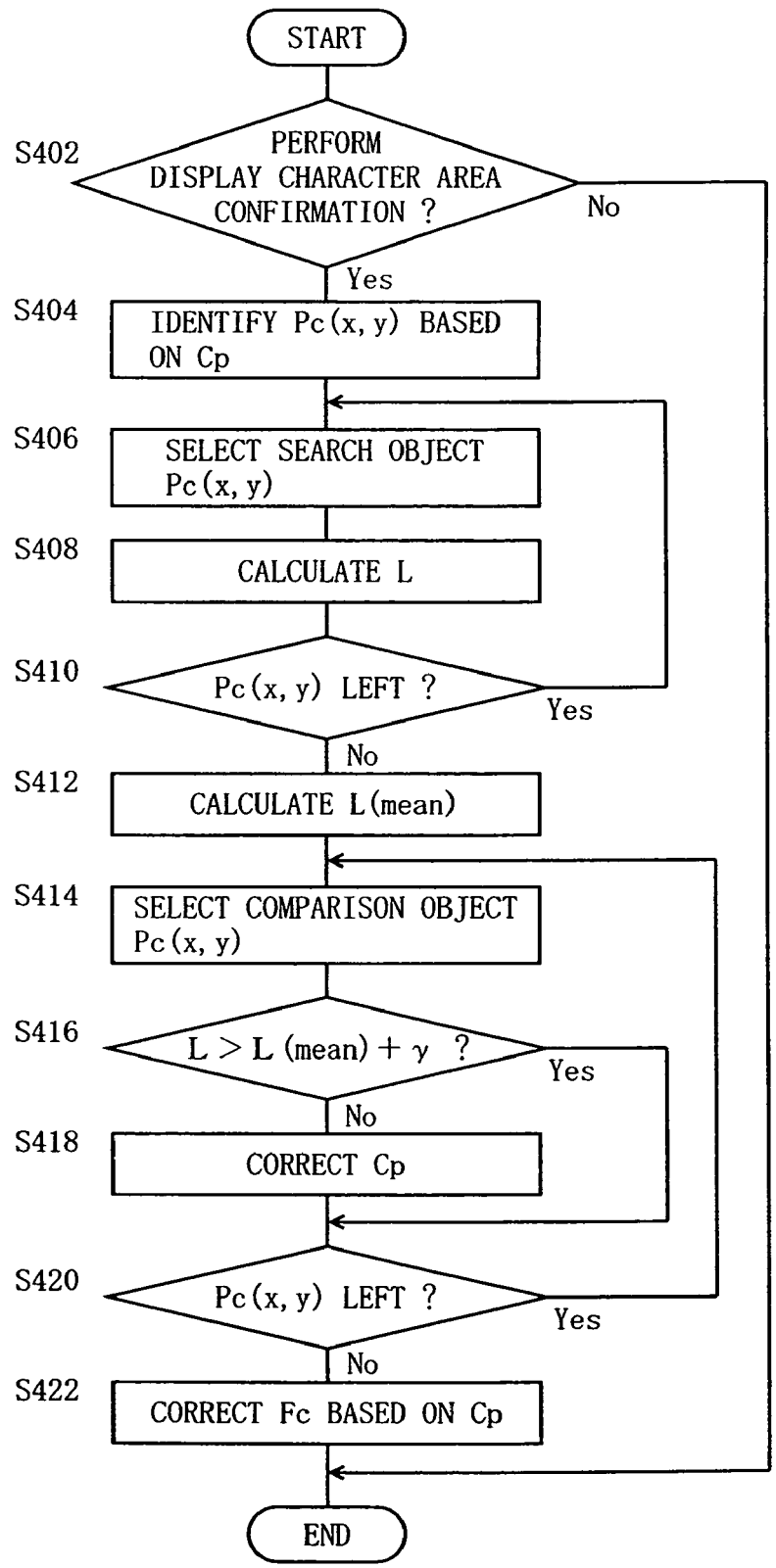
FIG. 11 is a flowchart depicting the operation in the character display area recognizing subroutine shown in FIG. 3.

Next, referring to FIG. 11, the operation in the character display area recognizing subroutine #400 will be explained in detail. When the character display area recognizing subroutine #400 is started, first at step S402, whether to perform the character display area recognition is determined. Preferably, to the user, a message "perform the character display area recognition?" is displayed on the monitor so that the user responds to the message by using input means such as a remote control unit. However, it may be predetermined whether to perform the character display area recognition in the combination of the kind of the video stream and the kind of the character information Ic. Then, the control proceeds to the next step S404.

At step S404, the character pixel coordinate information Cp is read from the character display pixel table storage memory 013, and the character pixel Pc(x, y) is identified based on the character pixel coordinate information Cp. Then, the control proceeds to the next step S406.

At step S406, the order is determined in which the from-other-pixel total distance L is obtained for all the character pixels Pc(x, y) identified at step S404, and the character pixels Pc are selected one by one in the determined order. Then, the control proceeds to the next step S408.

At step S408, the from-other-pixel total distance L is calculated for the character pixel Pc selected at step S406. Then, the control proceeds to the next step S410.

At step S410, it is determined whether, of all the character pixels Pc identified as the area confirmation objects at step S404, one the from-other-pixel total distance of which is not calculated is left. When the result is Yes, the control returns to step S406, and the next character pixel Pc is selected. Thereafter, the processing is repeated until the result of the determination is No at this step. Then, when the result is No, that is, when the from-other-pixel total distance L is calculated for all the character pixels Pc, the control proceeds to the next step S412.

At step S412, the average from-other-pixel total distance L(mean) is calculated. Then, the control proceeds to the next step S414.

At step S414, like at step S406, the character pixel Pc the from-other-pixel total distance L of which is to be compared with the average from-other-pixel total distance L(mean) is selected. Then, the control proceeds to the next step S416.

At step S416, it is determined whether the from-other-pixel total distance L is smaller than the average from-other-pixel total distance L(mean) by a predetermined distance γ. γ is a distance determined as appropriate according to the image quality of the video stream SVc or the like. When the result is No, that is, when it is determined that the character pixel Pc is not the character information Ic, the control proceeds to the next step S418.

At step S418, the character pixel coordinate information Cp is corrected. Specifically, the (x, y) coordinates of the character pixel Pc determined not to be the character information Ic at step S416 from the character pixel coordinate information Cp is deleted from the character pixel coordinate information Cp. Then, the control proceeds to the next step S420.

At step S420, like at step S410, it is determined whether, of all the character pixels Pc selected as the comparison at step S414, one on which the comparison with the average from-other-pixel total distance L(mean) is not performed is left. When the result is Yes, the control returns to step S414, and the next character pixel Pc is selected. Thereafter, the processing is repeated until the result of the determination is No at this step. Then, when the result is No, that is, when the comparison with the average from-other-pixel total distance L(mean) is performed for all the character pixels Pc, the control proceeds to the next step S422.

At step S422, when necessary, the character frame information Fc is corrected based on the character pixel coordinate information Cp corrected at step S418 like at the step S316 described above. Then, the processing of the character display area recognizing subroutine #400 is ended.

Next, referring to FIG. 12, the basic idea of the processing in the character line width recognizing subroutine #500 will be explained. The character line width recognizing subroutine #500 is to further improve the accuracy of the character recognition by extracting the line width of the character from the continuity of the occurrence of the character pixels Pc in the horizontal and the vertical directions based on the characteristic that characters are generally drawn with a constant character line width, determining that the character pixel Pc having an extremely different continuous value is not the character information Ic, and deleting its registration from the character pixel coordinate information Cp.

Figure 12:
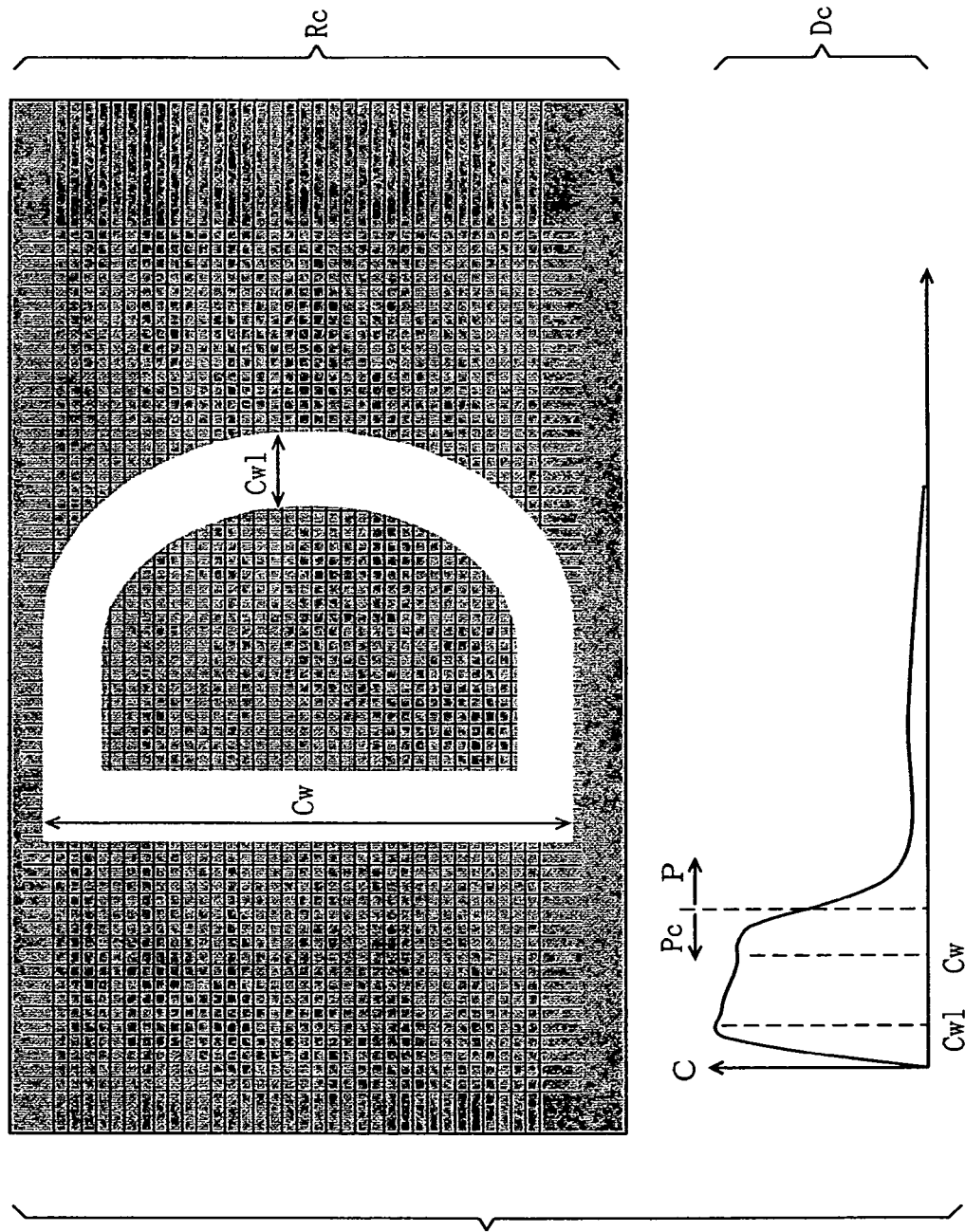
FIG. 12 is an explanatory view of the character line width recognition in a character line width recognizing subroutine shown in FIG. 3.

In FIG. 12, a limited area Rc including "D" of the character information Ic in the screen image I shown in FIG. 4 is shown so as to be enlarged, and a continuous value distribution Dc of the character pixel Pc is shown. As shown in the figure, characters are drawn with a constant character line width Cw1. Therefore, in the continuous value distribution Dc of the character registration pixels in the horizontal or the vertical direction, the values are concentrated close to the value of the character line width Cw1. Even if the continuous value C is higher than the character line width Cw1, it is never equal to or higher than the character size width Cw because characters are independent of one another. Although depending on the font, the character size width Cw is generally approximately several to several tens of times the character line width Cw1. Therefore, it is determined that the character pixel Pc having a continuous value C extremely higher than the character line width Cw1 is not the character information Ic, and its registration is deleted from the character pixel coordinate information Cp.

Figure 13:
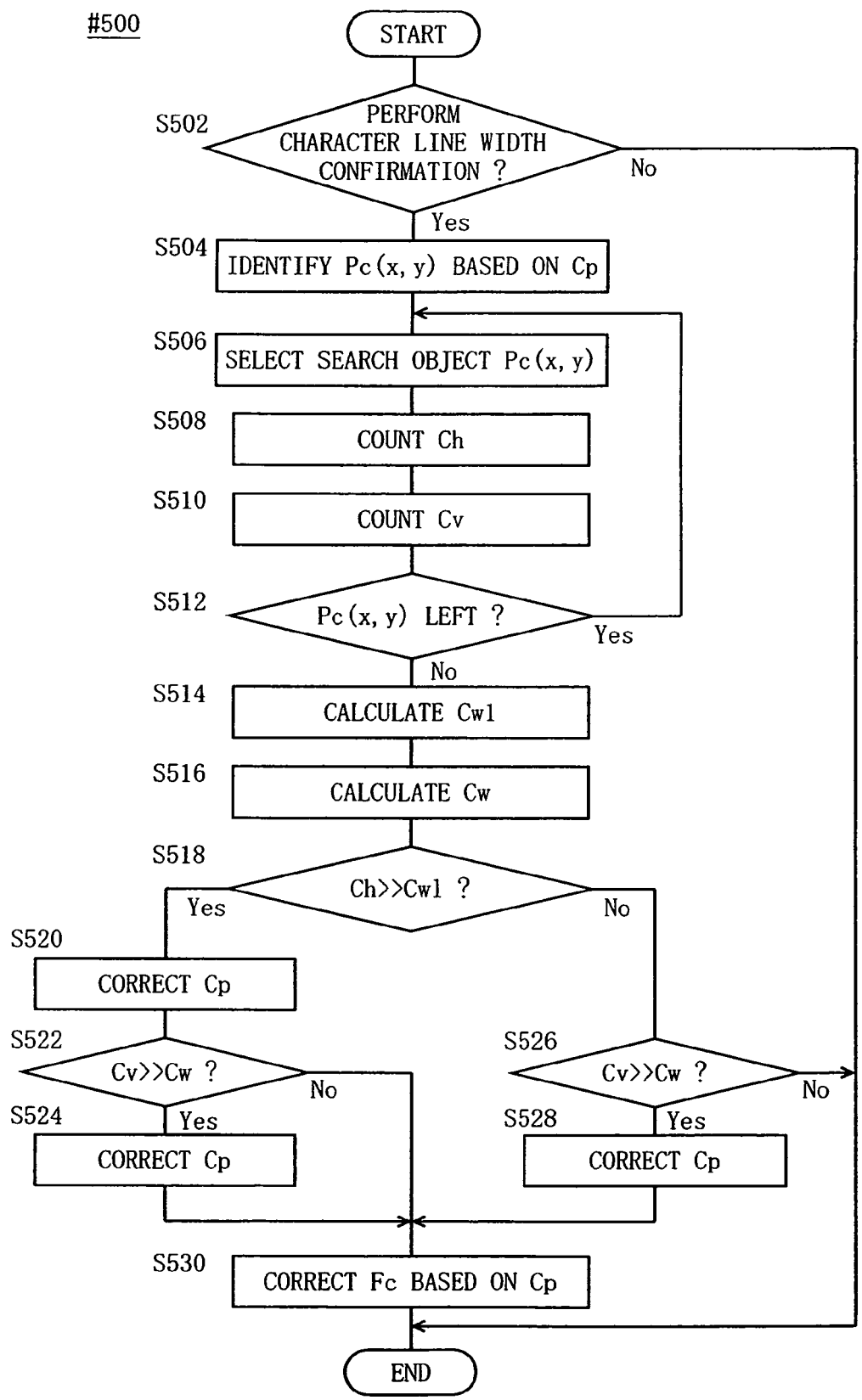
FIG. 13 is a flowchart depicting the operation in the character line width recognizing subroutine shown in FIG. 3.

Referring to the flowchart shown in FIG. 13, details of the operation in the character line width recognizing subroutine #500 will be explained. When the character line width recognizing subroutine #500 is started, first, at step S502, whether to perform the character line width recognition is determined. Preferably, to the user, a message "perform the character line width recognition?" is displayed on the monitor so that the user responds to the message by using input means such as a remote control unit. However, it may be predetermined whether to perform the character line width recognition in the combination of the kind of the video stream Svc and the kind of the character information Ic. Then, the control proceeds to the next step S504.

At step S504, the character pixel coordinate information Cp is read from the character display pixel table storage memory 013, and the character pixel Pc is identified based on the character pixel coordinate information Cp. Then, the control proceeds to the next step S506.

At step S506, the order is determined in which the character line width recognition is performed on the character pixels Pc identified at step S504, and the character pixels Pc are selected one by one in the determined order. Preferably, the values of x and y are counted up in the order of raster scan every time the same color determination processing is ended for each set character pixel Pc, and the object of search is selected. Then, the control proceeds to the next step S508.

At step S508, the continuous values Ch in the horizontal direction are counted for the character pixels Pc selected at step S506. Then, the control proceeds to the next step S510.

At step S510, the continuous values Cv in the vertical direction are counted for the character pixels Pc selected at step S506. Then, the control proceeds to the next step S512.

At step S512, it is determined whether, of all the character pixels Pc identified at step S504, one the continuous values Ch and the continuous values Cv of which are not counted is left. When the result is Yes, the control returns to step S506, and the next character pixel Pc is selected. Thereafter, the processing is repeated until the result of the determination is No at this step. Then, when the result is No, that is, when the continuous value Ch and the continuous value Cv are counted for all the character pixels Pc, the control proceeds to the next step S514.

At step S514, the average of the continuous values Ch counted at step S508 is obtained to obtain the character size width Cw1. Then, the control proceeds to the next step S516.

At step S516, the average of the continuous values Cv counted at step S510 is obtained to obtain the character size width Cw. Then, the control proceeds to the next step S518.

At step S518, it is determined whether the continuous value Ch is extremely higher than the character line width Cw1. The degree of the extremity is determined as appropriate based on the video stream SVc and the character information Ic. When the result is Yes, that is, when it is determined that the character pixel Pc is not one corresponding to the character information Ic from the viewpoint of the character size width Cw1, the control proceeds to the next step S520.

At step S520, the registration of the character pixel Pc is deleted from the character pixel coordinate information Cp. Then, the control proceeds to step S522.

At step S522, it is determined whether the continuous value Cv is extremely higher than the character size width Cw. The degree of the extremity is determined as appropriate based on the video stream SVc and the character information Ic. When the result is Yes, that is, when it is determined that the character pixel Pc is not one corresponding to the character information Ic from the viewpoint of both the character size width Cw1 and the character size Cw, the control proceeds to the next step S524.

At step S524, the registration of the character pixel Pc is deleted from the character pixel coordinate information Cp. Since the character pixel Pc is already deleted from the character pixel coordinate information Cp at step S520 before deleted at this step, this step may be omitted to avoid an overlap of the processing. However, to ensure the accuracy of the character line width confirmation for the character pixel Pc, by retaining this step, the character information Ic can be more accurately recognized and processed by recording, in the character pixel coordinate information Cp, the determination result that the character pixel Pc is not one corresponding to the character information Ic from the viewpoint of both the character line width Cw1 and the character size width Cw. Then, the control proceeds to step S530.

When the result at the step S522 described above is No, that is, when it is determined that the character pixel Pc is one corresponding to the character information Ic from the viewpoint of the character line width Cw1 and is one corresponding to the character information Ic also from the viewpoint of the character size width Cw, the control skips step S524, and proceeds to step S530.

When the result at the step S518 described above is No, that is, when it is determined that the character pixel Pc is one corresponding to the character information Ic from the viewpoint of the character size width Cw1, the control proceeds to step S526.

At step S526, like at step S522, it is determined whether the continuous value Cv is extremely higher than the character size width Cw. When the result is Yes, that is, when it is determined that the character pixel Pc is the character information Ic from the view point of the character line width Cw1 and is not the character information Ic from the viewpoint of the character size width Cw, the control proceeds to step S528.

At step S528, from the character pixel coordinate information Cp, the registration of the character pixel Pc is deleted from the character pixel coordinate information Cp. By also recording, in the character pixel coordinate information Cp, that the character pixel Pc is determined to be the character information Ic from the viewpoint of the character line width Cw1 and the character pixel Pc is determined not to be the character information Ic from the viewpoint of the character size width Cw at this step, the character information Ic can be more accurately recognized and processed.

At step S530, the character frame information Fc is corrected based on the character pixel coordinate information Cp corrected at each of the steps S520, S524, and S530 described above. Then, the processing of the character line width recognizing subroutine #500 is ended. When the result is No at the step S502 described above, the control skips steps S502 to S530, and proceeds to the character edge recognizing subroutine #600 without performing the character line width recognition processing.

Figure 14:
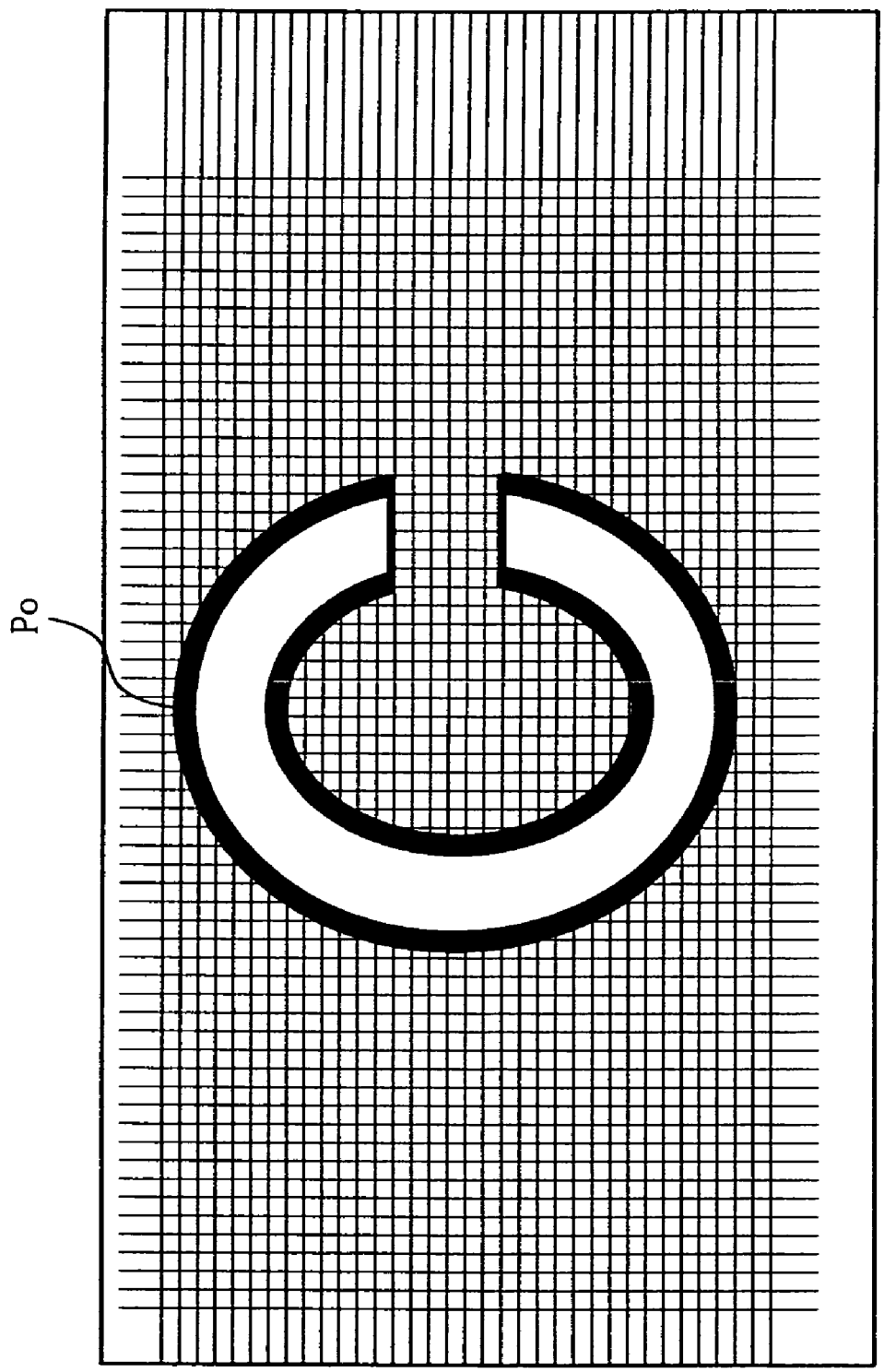
FIG. 14 is an explanatory view of the character edge recognition in a character edge recognizing subroutine shown in FIG. 3.

Next, referring to FIG. 14 and FIG. 15, the processing in the character edge recognizing subroutine #600 will be explained. The character edge recognizing subroutine #600 is to recognize the character information Ic where each character is displayed so as to be edged with a constant color, which is frequently used as a character display method. In FIG. 14, a limited area including "C" of the character information Ic shown in FIG. 4 is shown so as to be enlarged. As illustrated in the figure, when characters are edged, the colors of the edge pixels Po are generally the same. That is, the values of the brightness VY, the color difference Cb, and the color difference Cr of the pixels P(x, y) situated in the part of the edge are the same. In other words, the possibility is extremely high that the pixels P(x, y) the values of the brightness VY, the color difference Cb and the color difference Cr of which are the same are edge pixels Po.

Therefore, it is determined whether the values of the brightness VY, the color difference VCb, and the color difference VCr of the pixels P(x, y) situated in the periphery of the character pixel Pc registered in the character display pixel table storage memory 013 are the same, and when the proportion of the peripheral pixels P(x, y) having the same brightness VY, the color difference Cb, and the color difference Cr is equal to or larger than a predetermined proportion, the character is recognized as being edged. The pixels P(x, y) situated in the periphery are four pixels P(x, y), each of which is not the nearest character pixel Pc, in the positive and the negative directions in the horizontal and the vertical directions of the character pixels Pc.

Then, it is stored in the character display pixel table storage memory 013 that edging is used as the character display method. In this case, preferably, the coordinates (x, y) of the detected edge pixels Po are also recorded as part of the character pixel coordinate information Cp. The recognition accuracy of the character information Ic is further improved by deleting the registration of the character pixels Pc where the peripheral pixels are not drawn with the edging color of the extracted edge pixels P0. The erroneous detection of the character pixels is reduced.

Figure 15:
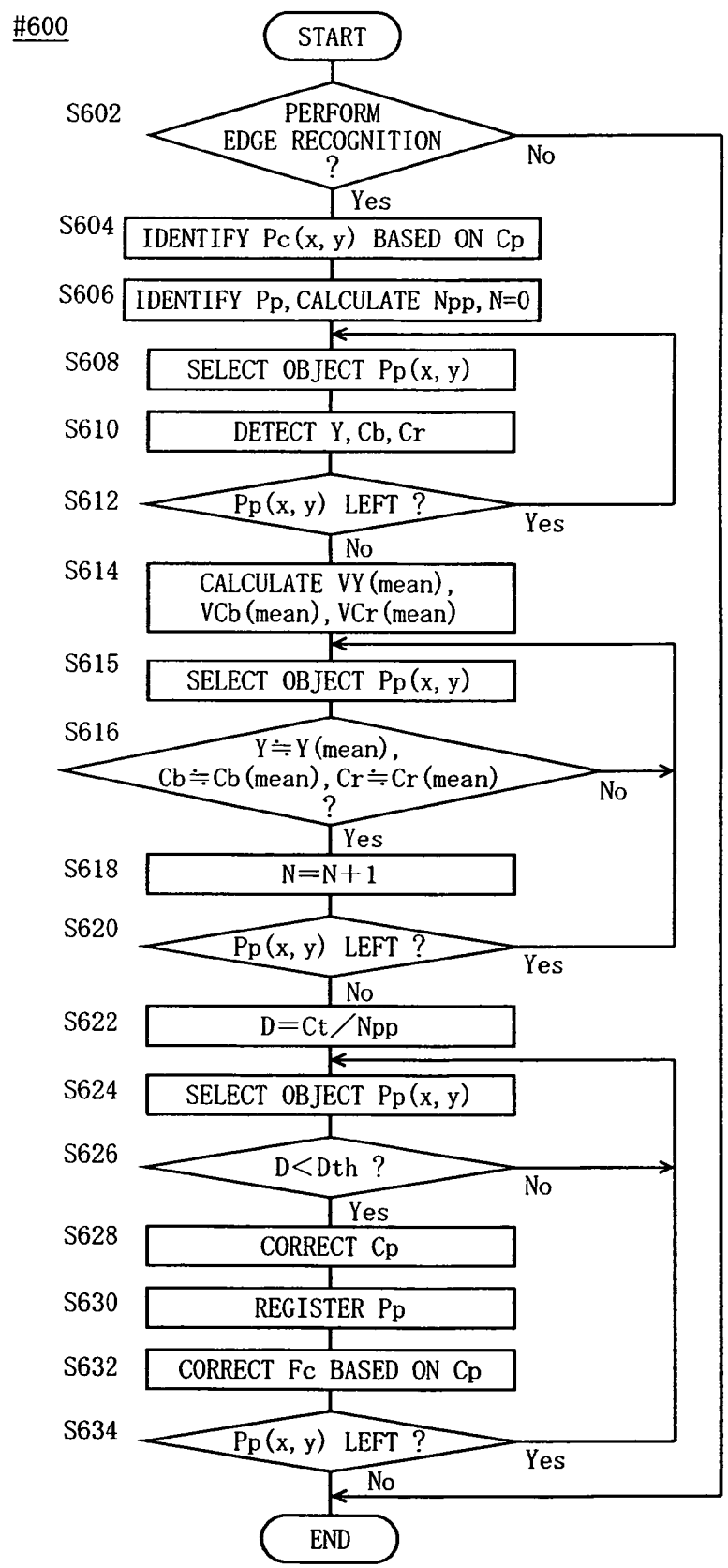
FIG. 15 is a flowchart depicting the operation in the character edge recognizing subroutine shown in FIG. 3.

Referring to FIG. 15, the detailed operation in the character edge recognizing subroutine #600 will be explained. When the character edge recognizing subroutine #600 is started, first, at step S602, whether to perform the character edge recognition is determined. Preferably, to the user, a message "perform the character edge recognition?" is displayed on the monitor so that the user responds to the message by using input means such as a remote control unit. However, it may be predetermined whether to perform the character edge recognition in the combination of the kind of the video stream and the kind of the character information Ic. Then, the control proceeds to the next step S604.

At step S604, the character pixel coordinate information Cp is read from the character display pixel table storage memory 013, and the character pixel Pc is identified based on the character pixel coordinate information Cp. Then, the control proceeds to the next step S606.

At step S606, the coordinates (x, y) of the peripheral pixels Pp of the character pixel Pc identified at step S604 are identified. Further, the total number Npp of identified peripheral pixels Pp is calculated, and a counter Ct is set at 0. As mentioned above, in this example, four pixels P(x, y), each of which is not the nearest character pixel Pc, in the positive and the negative directions in the horizontal and the vertical directions of the character pixels Pc are identified as the peripheral pixels Pp. Then, the control proceeds to the next step S608.

At step S608, the order is determined in which the edge recognition processing is performed on the peripheral pixels Pp identified at step S606, and the peripheral pixels Pp are selected one by one in the determined order. Preferably, the values of x and y are counted up in the order of raster scan every time the edge recognition processing is ended for each set peripheral pixel Pp, and the next peripheral pixel Pp is selected. Then, the control proceeds to the next step S610.

At step S610, the brightnesses VY, the color difference values VCb and the color difference values VCr of the peripheral pixels Pp are detected. Then, the control proceeds to the next step S612.

At step S612, it is determined whether, of all the peripheral pixels Pp identified at step S606, one the brightness VY, the color difference value VCb, and the color difference value VCr of which are not detected is left. When the result is Yes, the control returns to the next step S608, and the next peripheral pixel Pp is selected. Thereafter, the processing is repeated until the result of the determination is No at this step. Then, when the result is No, that is, when the continuous value Ch and the continuous value Cv are counted for all the character pixels Pc, the control proceeds to the next step S614.

At step S614, the averages of all the obtained brightnesses VY, color difference values VCb and color difference values VCr are obtained to obtain an average brightness VY (mean), an average color difference value VCb (mean), and an average color difference value VCr (mean). Then, the control proceeds to step S615.

At step S615, like at step S608, the order is determined in which whether the peripheral pixels Pp are displayed in the same color is determined, and the peripheral pixels Pp are selected one by one in the determined order. Then, the control proceeds to the next step S616.

At step S616, for the peripheral pixels Pp selected at step S615, it is determined whether the brightness VY, the color difference Cb signal, and the color difference value VCr have similar values to the average brightness VY(mean), the average color difference value VCb (mean), and the average color difference value VCr(means), respectively. The degree of the similarity is determined as appropriate according to the video stream SVc, the character information Ic, and further, the edge. When the result is Yes, that is, when it is determined that the peripheral pixels Pp are edge pixels Po, the control proceeds to the next step S618.

At step S618, the counter Ct is incremented by 1. Then, the control proceeds to the next step S620.

At step S620, like at step S612, it is determined whether, of the peripheral pixels Pp selected at step S615, one on which the determination as to whether the peripheral pixel Pp is the edge pixel Po has not been performed yet is left. When the result is Yes, the control proceeds to step S615, and the next peripheral pixel Pp is selected. Thereafter, the processing is repeated until the result of the determination is No at this step. Then, when the result is No, that is, when the determination as to whether the peripheral pixel Pp is the edge pixel Po is performed on all the peripheral pixels Pp, the control proceeds to the next step S618.

When the result is No at the step S616 described above, that is, when it is determined that the peripheral pixel Pp is not the edge pixel Po, skipping step S618 and step S620, the control returns to step S615.

At step S622, the value of the counter Ct obtained at step S618 is divided by the total number Npp of peripheral pixels Pp to obtain a same color proportion D of the peripheral pixels Pp displayed in the same color. Then, the control proceeds to the next step S624.

At step S624, like at step S615, the order is determined in which whether the peripheral pixel Pp is the edge pixel is determined, and the peripheral pixels Pp are selected one by one in the determined order. Then, the control proceeds to the next step S626.

At step S626, it is determined whether the same color proportion D obtained at step S622 is smaller than a proportion threshold value Dht. The proportion threshold value Dth is determined as appropriate according to the video stream SVc, the character information Ic, and the edge condition. Then, the control proceeds to the next step S628. When the result is Yes, that is, when it is determined that the peripheral pixel Pp is not the edge pixel Po, the control proceeds to the next step S628.

At step S628, the registration of the peripheral pixel Pp corresponding to the peripheral pixel Pp is deleted from the character pixel coordinate information Cp. Then, the control proceeds to the next step S630.

At step S630, the peripheral pixel Pp is registered in the character display pixel table storage memory 013 as the character pixel coordinate information Cp. Then, the control proceeds to the next step S632.

At step S632, the character frame information Fc is corrected as appropriate based on the character pixel coordinate information Cp. Then, the control proceeds to the next step S634.

At step S634, it is determined whether, of all the peripheral pixels Pp selected at step S624, one on which the determination as to whether the peripheral pixel Pp is the edge pixel Po has not been performed yet is left. When the result is No, the control returns also to step S624.

When the result is No at the step S626 described above, the control skips steps S628, S630, S632 and S634, and returns to step S624.

When the result of the determination is No at step S634, the processing of the character edge recognizing subroutine #600 is ended.

Figure 16:
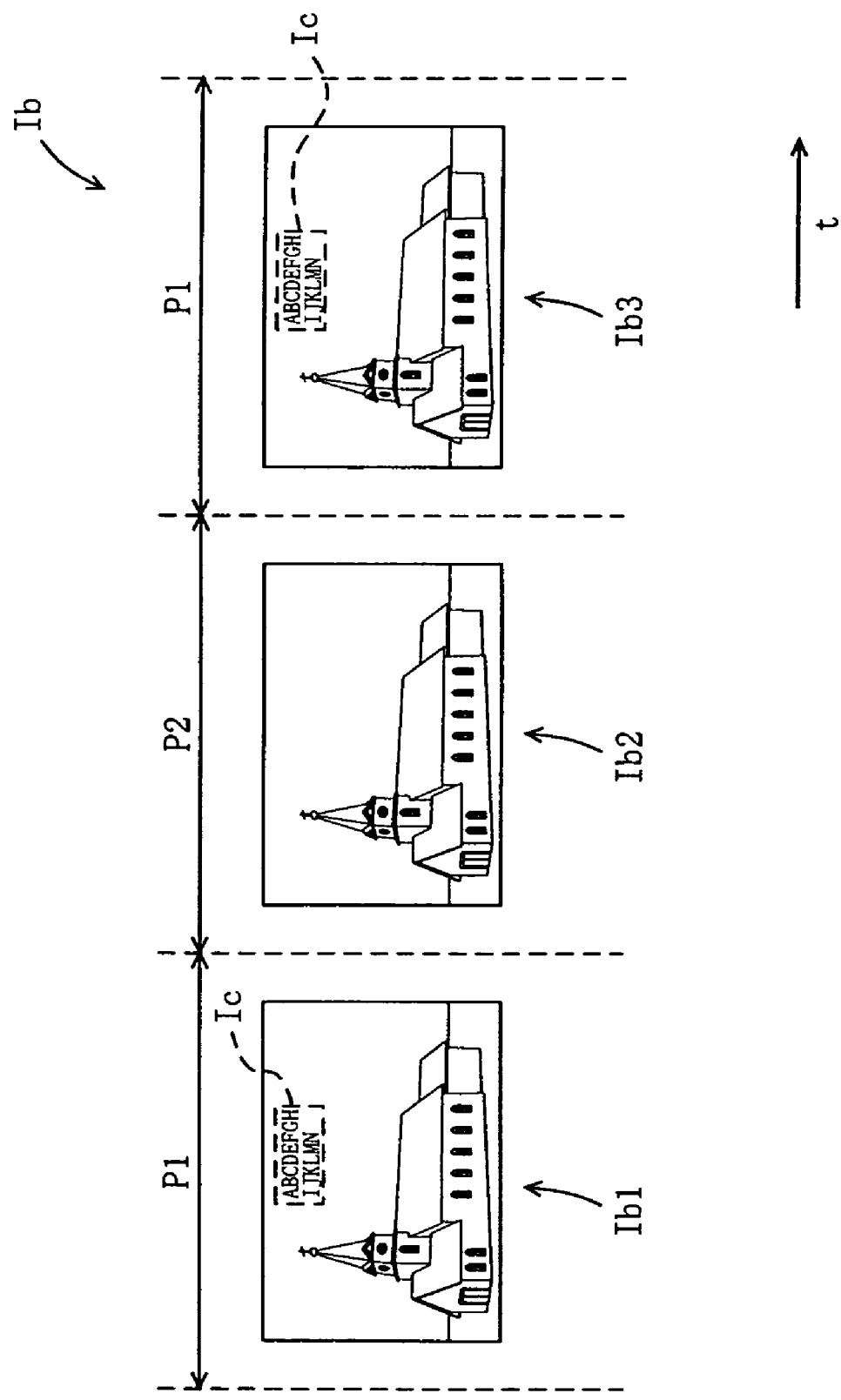
FIG. 16 is an explanatory view of the blinking display recognition in a blinking display recognizing subroutine shown in FIG. 3.
Figure 17:
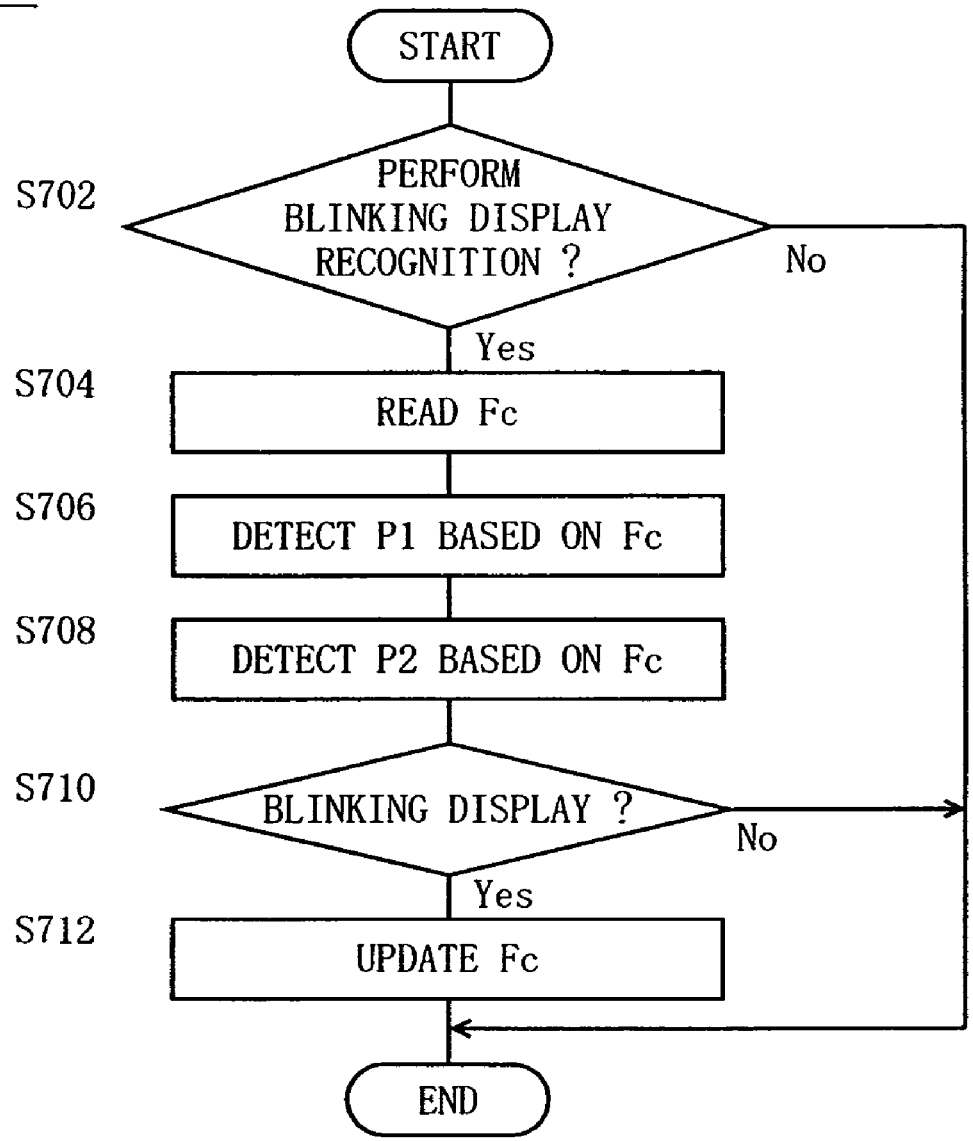
FIG. 17 is a flowchart depicting the operation in the blinking display recognizing subroutine shown in FIG. 3.

Next, referring to FIG. 16 and FIG. 17, the processing in the blinking display recognizing subroutine #700 will be described. The blinking display recognizing subroutine #700 is to recognize the character information Ic where each character is blinked by the repetition of deletion and display at regular intervals, which is frequently used as the character display method. In FIG. 16, three screen images Ib1, Ib2, and Ib3 are shown together with the lapse of time from the left to the right. The character information Ic is displayed in the screen image Ib1, no character information Ic is displayed in the screen image Ib2, and the character information Ic is displayed in the screen image Ib3 like in the screen image Ib1. In the blinking display, a character displayed section P1 where the character information Ic is displayed and a character deleted section P2 alternately appear in the direction of the time axis like the screen image Ib1 and the screen image Ib2, and the lengths of the time, that is, the periods of the character displayed section P1 and the character deleted section P2 are the same at any positions on the time axis.

Referring to the flowchart shown in FIG. 17, details of the operation of the blinking display recognizing subroutine #700 will be explained. When the blinking display recognizing subroutine #700 is started, first, at step S702, whether to perform the blinking display recognition is determined. Preferably, to the user, a message "perform the blinking display recognition?" is displayed on the monitor so that the user responds to the message by using input means such as a remote control unit. However, it may be predetermined whether to perform the blinking display recognition in the combination of the kind of the video stream and the kind of the character information Ic. Then, the control proceeds to the next step S704.

At step S704, the character frame information Fc is read from the character display frame table storage memory 014. Then, the control proceeds to the next step S706.

At step S706, the character displayed section P1 is detected from the frame continuity registered in the character display frame table storage memory 014 based on the character frame information Fc. Then, the control proceeds to the next step S708.

At step S708, the character deleted section P2 is detected from the period during which the frame continuity registered in the character display frame table storage memory 014 is discontinued, based on the character frame information Fc. Then, the control proceeds to the next step S710.

At step S710, it is determined whether the display method of the character information Ic is blinking display. Specifically, it is determined that the display method of the character information Ic is blinking display when the character displayed section P1 and the character deleted section P2 detected at step S706 and step S708, respectively, have predetermined values. Then, the control proceeds to the next step S712.

At step S712, it is stored in the character frame information Fc that the display method of the character information Ic is blinking display. Then, for the control, the processing of the blinking display recognizing subroutine #700 is ended.

At step S710, when it is determined that the character information Ic is not blinking display, the control skips step S712, and the processing of the blinking display recognizing subroutine #700 is ended. Likewise, when the result is No at step S702, the control skips steps S704 to S710, and the processing of the blinking display recognizing subroutine #700 is ended.

Figure 18:
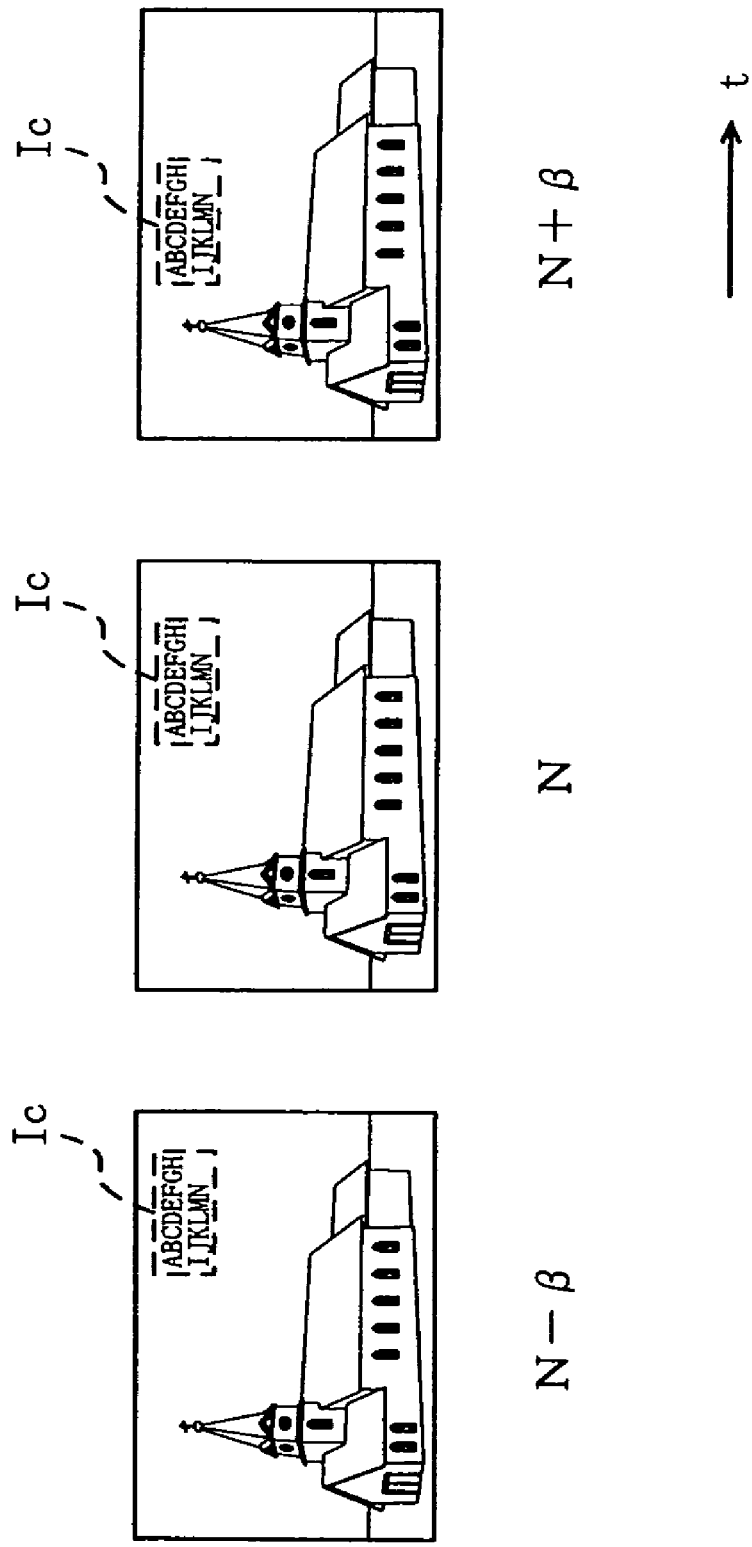
FIG. 18 is an explanatory view of the moving display recognition in a moving display recognizing subroutine shown in FIG. 3.
Figure 19:
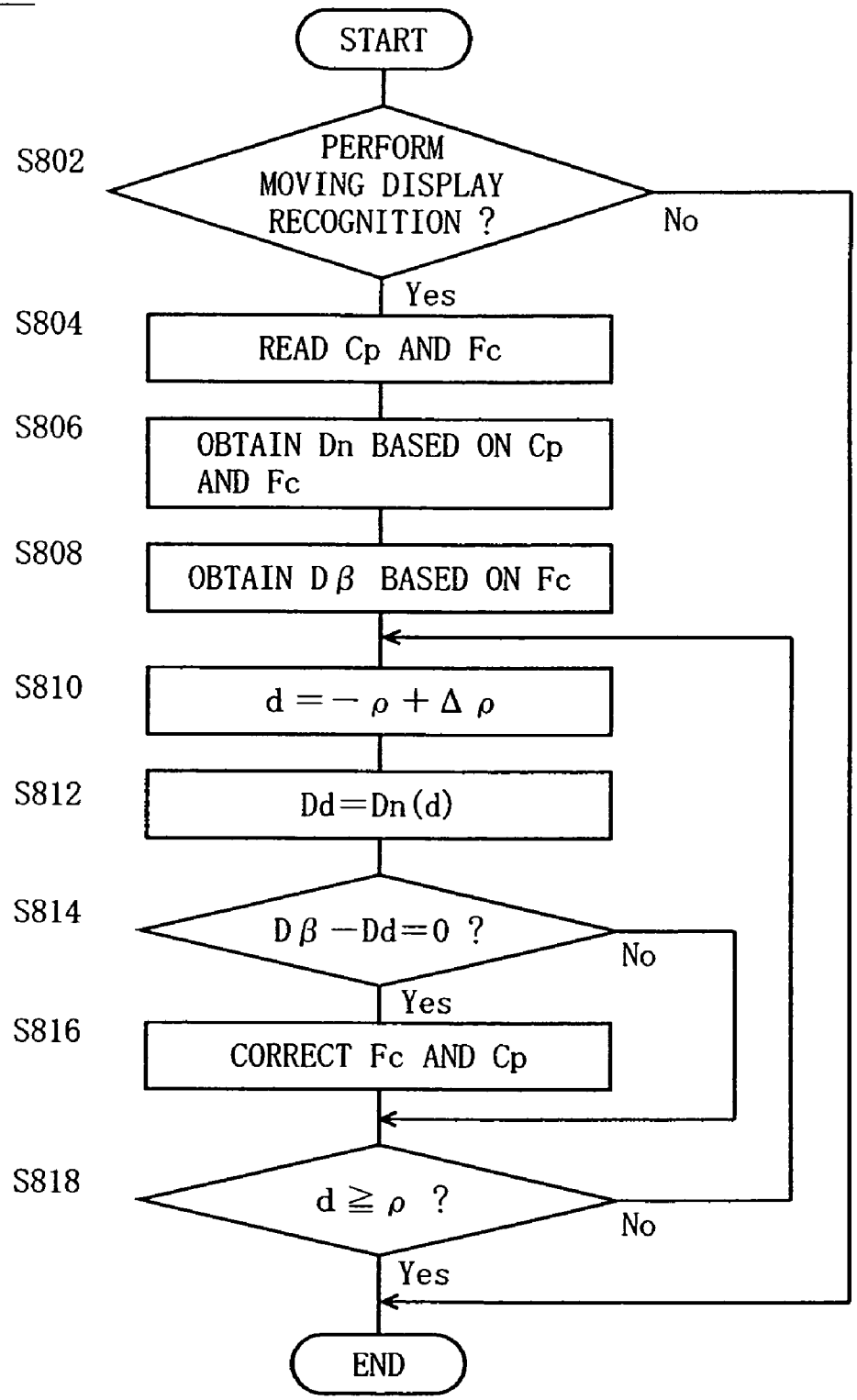
FIG. 19 is a flowchart depicting the operation in the moving display recognizing subroutine shown in FIG. 3.

Next, referring to FIG. 18 and FIG. 19, the moving display recognizing subroutine #800 will be explained. The moving display recognizing subroutine #800 is a processing to recognize a moving display in which the character information Ic moves in the horizontal or the vertical direction at a constant speed, which is frequently used as a character display method. FIG. 18 depicts a state where character pixels displayed by frames which are the moving display are displayed while being moved horizontally with respect to the direction of advance of the time axis. That is, the character information Ic on a frame N at an arbitrary time should coincide with the character pixels Pc on a frame N±β (β is an arbitrary positive integer) that are horizontally or vertically moved by β frames.

That is, when the distribution of the character pixels Pc of the frame N registered in the character display pixel table storage memory 013 coincides with the distribution where the positions of the character pixels Pc on the frame N±β registered in the character display pixel table storage memory 013 are horizontally or vertically shifted by β frames, it is recognized that the character information Ic is moving-displayed, and it is stored in the character display pixel table storage memory 013 that the display of the character information Ic is moving-displayed by β frames.

Next, referring to FIG. 19, the operation of the moving display recognizing subroutine #800 will be explained in detail. When the operation of the moving display recognizing subroutine #800 is started, first, at step S802, whether to perform the moving display recognition is determined. Preferably, to the user, a message "perform the moving display recognition?" is displayed on the monitor so that the user responds to the message by using input means such as a remote control unit. However, it may be predetermined whether to perform the moving display recognition in the combination of the kind of the video stream and the kind of the character information Ic. When the result is Yes, the control proceeds to the next step S804.

At step S804, the character pixel coordinate information Cp and the character frame information Fc are read from the character display pixel table storage memory 013 and the character display frame table storage memory 014, respectively. Then, the control proceeds to the next step S806.

At step S806, the pixel distribution Dn of the screen image I of the character pixels Pc of the frame N (N is an arbitrary positive integer) is obtained based on the character pixel coordinate information Cp and the character frame information Fc. Then, the control proceeds to the next step S808.

At step S808, the pixel distribution Dβ of the screen image I of the character pixels Pc of the frame N±β is obtained. To be exact, two kinds of distributions, a pixel distribution D β− preceding the frame N by β frames and a pixel distribution Dβ+ succeeding the frame N by β frames, are present, and in view of the space of the figure and for the convenience of explanation, the pixel distribution Dβ− and the pixel distribution Dβ+ will be collectively called image distribution Dβ. Then, the control proceeds to the next step S810.

At step S810, a movement coefficient d representing the maximum movable amount of the character information Ic in the screen image Ic of the frame N is calculated based on the following expression (3):

$$d = -\rho + \Delta\rho \tag{3}$$

The movement amount ρ is the movement amount corresponding to the pixel resolution in the screen image In, and Δρ is the minimum movement amount corresponding to the pixel resolution in the screen image In. Then, the control proceeds to the next step S812.

At step S812, a pixel distribution Dn(d) when the character information Ic moves by the movement coefficient d with respect to the frame N is calculated based on the pixel distribution Dn obtained at step S804. Then, the control proceeds to the next step S814.

At step S814, it is determined whether the pixel distribution Dn(d) obtained at step S812 coincides with the pixel distribution Dβ obtained at step S808. Specifically, it is determined whether the difference when the pixel distribution Dd is subtracted from the pixel distribution Dβ is 0. When the result is Yes, that is, when these distributions coincide with each other (the result of the subtraction is 0), the control proceeds to the next step S816.

At step S816, it is written into the character frame information Fc and the character pixel coordinate information Cp that the display method of the character information Ic is moving display. Then, the control proceeds to the next step S818.

When the result at step S814 is No, that is, when it is determined that the pixel distribution Dn(d) does not coincide with the pixel distribution Dβ, the control skips step S816, and proceeds to step S818.

At step S818, it is determined whether the movement coefficient d incremented by Δρ at step S810 is equal to or higher than the movement amount ρ. When the result is No, that is, since this means that the determination as to the coincidence of the pixel distribution Dn(d) with respect to the maximum movable range of the character information Ic in the screen image In, with the pixel distribution Dβ has not been finished yet, the control returns to step S810.

When the result is Yes, since this means that the determination as to the coincidence of the pixel distribution Dn(d) with respect to the maximum movable range of the character information Ic in the screen image In, with the pixel distribution Dβ has been finished, the moving display recognizing subroutine #800 is ended.

For the same color searching subroutine #300, the character display area recognizing subroutine #400, the character recognizing subroutine #500, the character edge recognizing subroutine #600, the blinking display recognizing subroutine #700, and the moving display recognizing subroutine #800, it is necessary only that the character pixel coordinate information Cp and the character frame information Fc be generated. Therefore, in this sense, in this example, after the preceding high-brightness pixel searching subroutine #200, the order in which the same color searching subroutine #300, the character display area recognizing subroutine #400, the character recognizing subroutine #500, the character edge recognizing subroutine #600, the blinking display recognizing subroutine #700, and the moving display recognizing subroutine #800 are performed may be changed as required. Further, according to the kind of the character information Ic to be recognized, an appropriate one of the same color searching subroutine #300, the character display area recognizing subroutine #400, the character recognizing subroutine #500, the character edge recognizing subroutine #600, the blinking display recognizing subroutine #700, and the moving display recognizing subroutine #800 may be selected for execution.

Next, referring to FIG. 20 and FIG. 21, the character processing unit 012 will be explained. The character processing unit 012 has the function of performing various processings on the character information Ic from the video stream SVc based on the information, on the character pixels Pc, of the character information Ic recognized by the character recognizing unit 011. The character processing unit 012 has the following functions: a character information deleting function of deleting the character information Ic; a character information deleting function of deleting the character information Ic when the character information Ic is blinking-displayed; a character information deleting function of deleting the character information Ic when the character information Ic is moving-displayed; a character information moving function of moving the character information Ic; a character information enlarging function of displaying the character information Ic so as to be enlarged/reduced; and an attention attracting area avoiding function of moving the display of the character information Ic to an area other than a specific attention attracting area.

Figure 20:
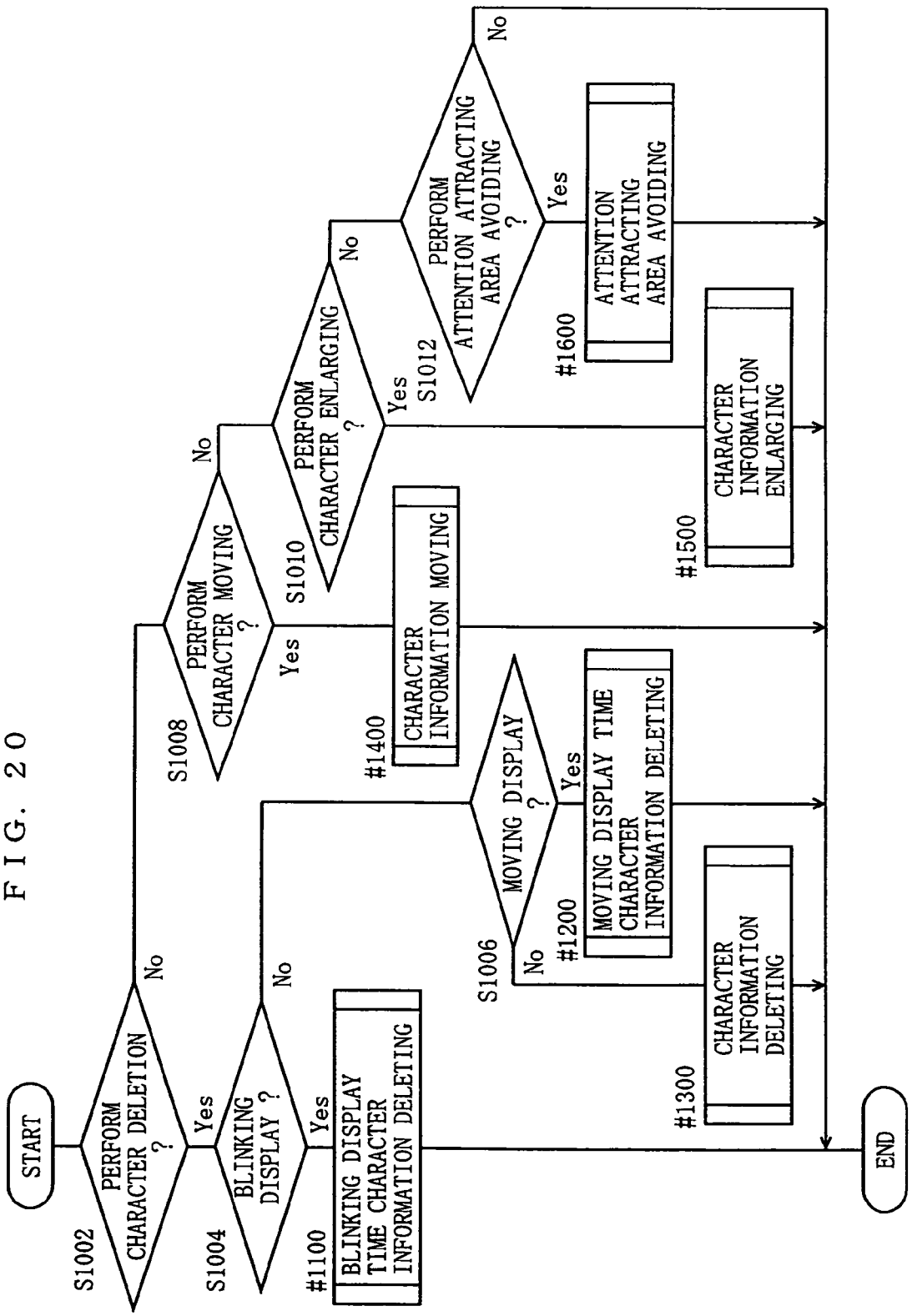
FIG. 20 is a flowchart depicting the principal character processing operation of the video processing device shown in FIG. 1.
Figure 21:
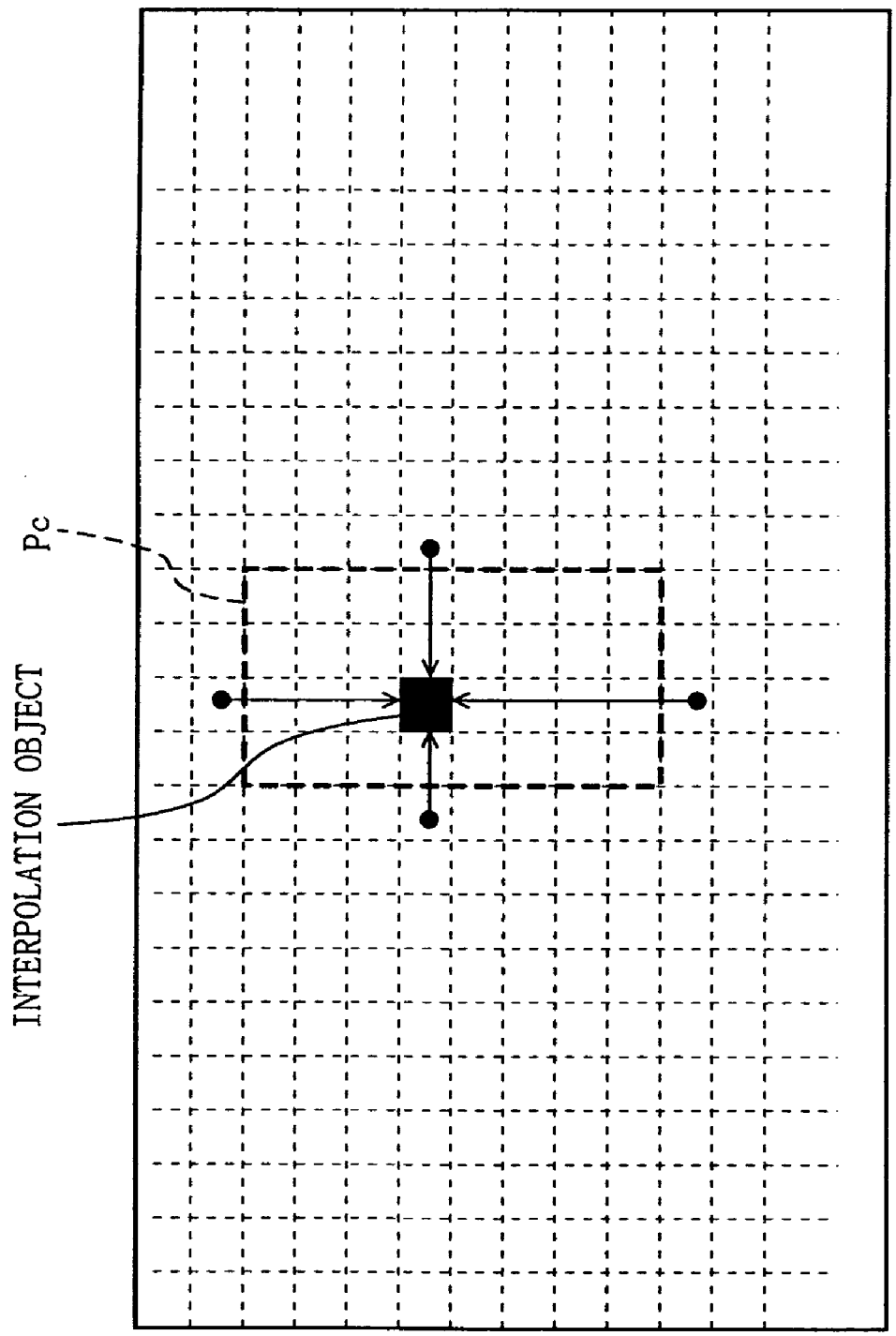
FIG. 21 is an explanatory view of the character deletion in a character information deleting subroutine shown in FIG. 20.

Referring to FIG. 20, the principal operation of the character processing by the character processing unit 012 will be explained. When the brightness signal Y, the color difference Cb signal, and the color difference Cr signal are inputted to the character processing unit 012 by way of the recognition processing in the character recognizing unit 011, the character processing by the character processing unit 012 is started. In the character display pixel table storage memory 013 and the character display frame table storage memory 014, the character frame information Fc and b character pixels Pc of a condition reflecting the result of the recognition processing are stored.

First, at step S1002, whether to perform the character deleting processing to delete the character information Ic on the video stream SVc is inquired of the user. Preferably, to the user, a message "perform the character information deleting processing?" is displayed on the monitor so that the user responds to the message by using input means such as a remote control unit. However, it may be automatically determined based on the character pixels Pc and the character frame information Fc. When the result is Yes, the control proceeds to the next step S1004.

At step S1004, it is determined that the display of the character information Ic is blinked in the video stream SVc. Specifically, this determination is made based on whether it is recorded in the character frame information Fc and the character pixel coordinate information Cp that the display method of the character information Ic is blinking display. When the result is No, the control proceeds to the next step S1006. When the result is Yes, the control proceeds to the next blinking display time character information deleting subroutine #1100.

In the blinking display time character information deleting subroutine #1100, the blinked character information Ic is deleted from the video stream SVc. This will be described later in detail. After the processing of the blinking display time character information deleting subroutine #1100, the character processing by the character processing unit 012 is ended.

At step S1006, it is determined whether the display of the character information Ic is moved in the video stream SVc. Specifically, this determination is made based on whether it is recorded in the character frame information Fc and the character pixel coordinate information Cp that the display method of the character information Ic is moving display. When the result is No, the control proceeds to a character deleting subroutine #1300. When the result is Yes, the control proceeds to the next moving display time character information deleting subroutine #1200.

In the moving display time character information deleting subroutine #1200, the moving-displayed character information Ic is deleted from the video stream SVc. This will be described later in detail. After the processing of the moving display time character information deleting subroutine #1200, the character processing by the character processing unit 012 is ended.

In the character deleting subroutine #1300, the character information Ic is deleted from the video stream SVc. This will be described later in detail. After the processing of the character deleting subroutine #1300, the character processing by the character processing unit 012 is ended.

When the result is No at step S1002, that is, when character deleting processing is not performed, the control proceeds to step S1008.

At step S1008, whether to perform the character moving processing to move the character information Ic on the video stream SVc is inquired of the user. Preferably, to the user, a message "perform the character information moving processing?" is displayed on the monitor so that the user responds to the message by using input means such as a remote control unit. More preferably, the user inputs a desired movement amount S. However, it may be automatically determined based on the character pixels Pc and the character frame information Fc. When the result is Yes, the control proceeds to a character information enlarging subroutine #1400. However, it may be automatically determined based on the character pixels Pc and the character frame information Fc. When the result is Yes, the control proceeds to the character information moving subroutine #1400.

In the character information moving subroutine #1400, the display position of the character information Ic is changed in the video stream SVc, that is, the character information Ic is moved on the screen image I. This will be described later in detail with reference to FIG. 23. After the processing of the character information moving subroutine #1400, the character processing by the character processing unit 012 is ended.

When the result is No at step S1008, that is, when character information moving processing is not performed, the control proceeds to step S1010.

At step S1010, whether to perform the character information enlarging processing to enlarge/reduce the character information Ic on the video stream SVc is inquired of the user. Preferably, to the user, a message "perform the character information enlarging processing?" is displayed on the monitor so that the user responds to the message by using input means such as a remote control unit. More preferably, the user inputs a desired enlargement ratio M. However, it may be automatically determined based on the character pixels Pc and the character frame information Fc. When the result is Yes, the control proceeds to a character information enlarging subroutine #1500.

In the character information enlarging subroutine #1500, the character information Ic is displayed so as to be enlarged in the video stream SVc. This will be described later in detail with reference to FIG. 24. After the processing of the character information enlarging subroutine #1500, the character processing by the character processing unit 012 is ended.

When the result is No at step S1010, that is, when the enlargement display processing of the character information Ic is not performed, the control proceeds to step S1012.

At step S1012, it is determined whether the display of the character information Ic is moved to an area other than the attention attracting area in the character information Ic. Preferably, to the user, a message "perform the attention attracting area avoiding processing?" is displayed on the monitor so that the user responds to the message by using input means such as a remote control unit. However, the determination may be automatically made based on the character pixels Pc and the character frame information Fc. When the result is Yes, the control proceeds to an attention attracting area avoiding subroutine #1600.

In the attention attracting area avoiding subroutine #1600, the character information Ic is moved from an area that easily attracts the attention of the viewer of the screen image I to an area that does not annoy the user in the video stream SVc. This will be described later in detail with reference to FIG. 25. After the processing of the attention attracting area avoiding subroutine #1600, the character processing by the character processing unit 012 is ended.

As described above, when it is recognized that the display method is blinking display in the blinking display recognizing subroutine #700 when the character deletion is performed, the character information Ic is deleted in the blinking display time character information deleting subroutine #1100. When it is recognized that the display method is moving display in the moving display recognizing subroutine #800, the character information Ic is deleted in the moving display time character information deleting subroutine #1200. In other cases, the character information Ic is deleted in the character deleting subroutine #1300.

When the character moving is performed, the character information Ic is moved in the character information moving subroutine #1400. When the character enlarging is performed, the character information Ic is enlarged in the character information enlarging subroutine #1500. When the attention attracting area avoiding is performed, the display of the character information Ic is moved to a non-attention attracting area in the character information enlarging subroutine #1600.

Next, referring to FIG. 21 and FIG. 22, the operation of the character deleting subroutine #1300 will be explained. FIG. 21 shows the character pixels Pc in the screen image I. In the figure, a method of deleting the character pixel Pc(x, y) will be described. The character information Ic is deleted by linearly interpolating the brightness VY, the color difference value VCb, and the color difference value VCr of the character pixel Pc(x, y) based on four pixels P which are neither the character pixels Pc nor the edge pixels Po and are nearest to the character pixel Pc(x, y) in the positive and the negative directions in the horizontal or the vertical direction. When the character pixel Pc(x, y) is the edge pixel Po, similarly, the deletion is performed by interpolating the brightness VY, the color difference value VCb, and the color difference value VCr of the edge pixel Po to be deleted based on near pixels P. The interpolation processing of the character pixel Pc or the edge pixel Po is performed based on the character pixel coordinate information Cp registered in the character display pixel table storage memory 013, whereby the interpolated value of the character information Ic is calculated.

That is, the character processing unit 012 overwrites the obtained interpolated value for each of the brightness signal Y, the color difference Cb signal, and the color difference Cr signal inputted from 0011, generates the processed brightness signal YT, the processed color difference Cb signal CbT, and the processed color difference Cr signal CrT, and outputs them. The processed brightness signal YT, the processed color difference Cb signal CbT, and the processed color difference Cr signal CrT are temporarily held in a processed brightness frame memory 008, a processed color difference Cb frame memory 009, and the processed color difference Cr frame memory 010 of the output memory 004, respectively, and then, combined into a video stream SVt by the postprocessor 015. In the video stream SVt, the character information Ic included in the video stream SVc is deleted.

Figure 22:
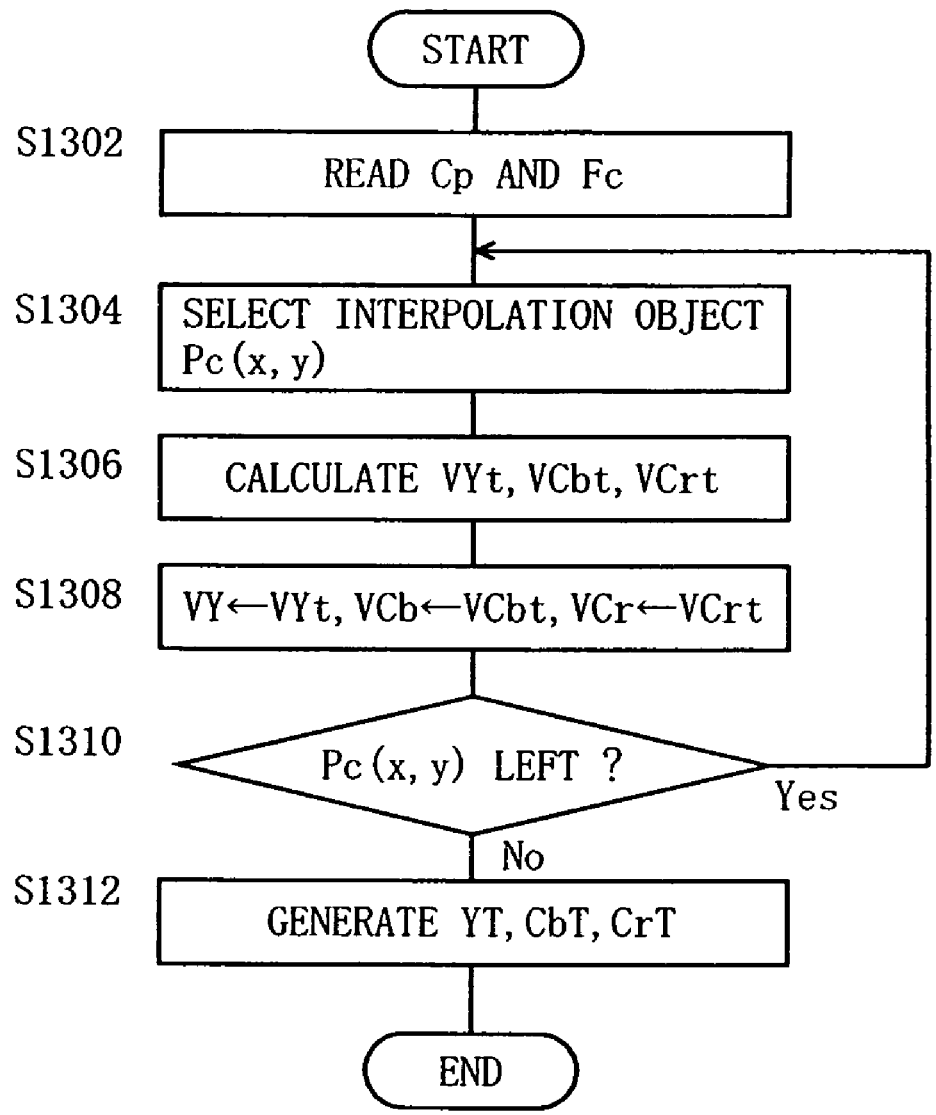
FIG. 22 is a flowchart depicting the operation of the character information deleting subroutine shown in FIG. 20.

Referring to FIG. 22, the operation of the character deleting subroutine #1300 will be described in detail. When the result is No at step S1006 in the flowchart shown in FIG. 20, the operation of the character deleting subroutine #1300 is started.

First, at step S1302, the character pixel coordinate information Cp and the character frame information Fc are read from the character display pixel table storage memory 013 and the character display frame table storage memory 014. Then, the control proceeds to the next step S1304.

At step S1304, the character pixel Pc(x, y) to be interpolated is selected in units of frame based on the character pixel coordinate information Cp. Then, the control proceeds to the next step S1306.

At step S1306, an interpolated brightness VYt, an interpolated color difference value VCbt, and an interpolated color difference value VCrt for the character pixel Pc selected at step S1304 are obtained by the method described above. Then, the control proceeds to the next step S1308.

At step S1308, the brightness VY, the color difference value VCb, and the color difference value VCr of the character pixel Pc(x, y) are overwritten with the interpolated brightness VYt, the interpolated color difference value VCbt, and the interpolated color difference value VCrt obtained at step S1306, respectively. Then, the control proceeds to the next step S1310.

At step S1310, it is determined whether, of the character pixels Pc(x, y) to be corrected defined by the character pixel coordinate information Cp read at step S1302, one whose interpolated brightness VYt, interpolated color difference value VCbt, and interpolated color difference value VCrt are not obtained is left. When the result is Yes, the control returns to step S1304, the processings at step S1034 to step S1308 are repeated, all the character pixels Pc(x, y) of the frame are overwritten with the interpolated brightness VYt, the color difference value VCrt, and the interpolated color difference value VCbt, and the character information Ic is deleted from the screen image I.

Thus, the brightness signal Y, the color difference Cb signal, and the color difference Cr signal where the character pixels Pc(x, y) are processed are called the processed brightness signal YT, the processed color difference Cb signal CbT, and the processed color difference Cr signal CrT, respectively. When the result is No at this step, the process proceeds to the next step S1312.

At step S1312, the processed brightness signal YT, the processed color difference Cb signal CbT and the processed color difference Cr signal CrT corresponding to the character pixels Pc(x, y) whose pixel values are rewritten are outputted to the output memory 004. The processed brightness signal YT, the processed color difference Cb signal CbT, and the processed color difference Cr signal CrT are combined into the video stream SVt by the postprocessor 015. Then, it is as mentioned above that the character information Ic included in the video stream SVc is deleted in the video stream SVt.

Except for the method of calculating the interpolated brightness VYt, the interpolated color difference value VCbt, and the interpolated color difference value VCrt at step S1306, the character deleting subroutine #1300 is basically applicable to the blinking display time character information deleting subroutine #1100 and the moving display time character information deleting subroutine #1200. This will be described below.

The blinking display time character information deleting subroutine #1100 is a processing selectable only when it is recognized that the display method of the character information Ic is blinking display by the blinking display recognizing subroutine #700. As the interpolation value of each of the brightness VY, the color difference value VCb, and the color difference value VCr of the character pixel Pc or the edge pixel Po which is the object of character deletion, the value of the corresponding pixel P (x, y) in a frame within the character deleted section P2 closest in time is used. By performing this processing on any one of the character pixel Pc and the edge pixel Po or both registered in the character display pixel table storage memory 013, the interpolated values (the interpolated brightness Vyt, the interpolated color difference value VCbt, and the color difference value VCrt) of the character information Ic are calculated.

Except that the object whose interpolated values are to be obtained is not the same frame but a frame close in time, the operation of the blinking display time character information deleting subroutine #1100 is similar to the operation in the character deleting subroutine #1300. In the character information deleting subroutine #1300, at step S1308, the interpolated values may be obtained not from the same frame but from a frame close in time like in the character information deleting subroutine #1300.

By the character processing unit 012, on the brightness signal Y, the color difference Cb signal, and the color difference Cr signal outputted from the character recognizing unit 011, the calculated interpolated values (the interpolated brightness VYt, the interpolated color difference value VCbt, and the color difference value VCrt) are overwritten to thereby generate the processed brightness signal YT, the processed color difference Cb signal CbT, and the processed color difference Cr signal CrT, and the generated signals are outputted to the postprocessor 015 through the output memory 004. Then, the postprocessor 015 generates the video stream SVt by combining the processed brightness signal YT, the processed color difference Cb signal CbT, and the processed color difference Cr signal CrT. In the screen image I of the video stream SVt, the character information Ic blinking-displayed in the video stream SVc is deleted.

The moving display time character information deleting subroutine #1200 is a processing that can be selected only when it is determined that the display method of the character information Ic is moving display by the moving display recognizing subroutine #800. As the interpolation value of each of the brightness VY, the color difference value VCb, and the color difference value VCr of the character pixel Pc or the edge pixel Po which is the object of character deletion, the value of the corresponding pixel P(x, y) in a frame, closest in time, of the frames where the object pixel is not registered as the character pixel Pc is used. The subsequent operation is similar to that in the character deleting subroutine #1300 and the blinking display time character information deleting subroutine #1100. Consequently, the character information Ic moving-displayed in the video stream SVc is deleted in the screen image I of the video stream SVt outputted from the postprocessor 015.

Figure 23:
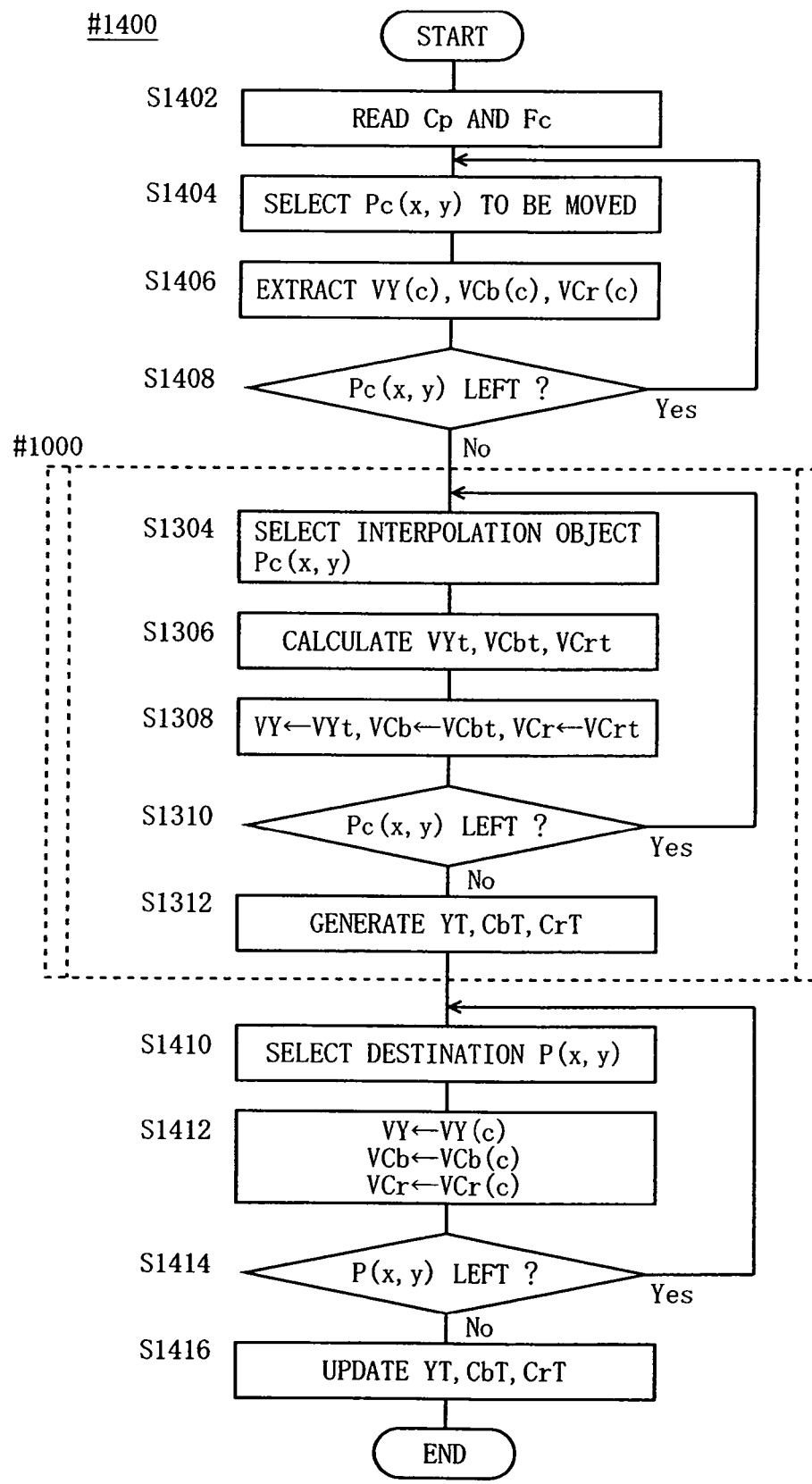
FIG. 23 is a flowchart depicting the operation of a character information moving subroutine shown in FIG. 20.

Referring to FIG. 23, details of the operation of the character information moving subroutine #1400 will be explained. The character information moving subroutine #1400 is a processing by the character processing unit 012 in which the character information Ic is moved from a position in the video stream SVC to another position. That is, the character information Ic to be deleted may be either a blinking-displayed one or a moving-displayed one.

First, at step S1402, the character pixel coordinate information Cp and the character frame information Fc are read from the character display pixel table storage memory 013 and the character display frame table storage memory 014. Then, the control proceeds to the next step S1404.

At step S1404, the character pixel Pc(x, y) to be moved is selected. Then, the control proceeds to the next step S1406.

At step S1406, the brightness VY, the color difference value VCb, and the color difference value VCr of the character pixel Pc(x, y) are extracted. For convenience of explanation, the brightness VY, the color difference value VCb, and the color difference value VCr of the character pixel Pc(x, y) extracted at this step are called a character brightness VY(c), a character color difference value VCb(c), and a character color difference value VCr(c), respectively, for distinction. That is, at this step, the character brightness VY(c), the character color difference value VCb(c), and the character color difference value VCr(c) are extracted. Then, the control proceeds to the next step S1408.

At step S1408, it is determined whether, of the character pixels Pc(x, y) to be moved, one whose character brightness VY(c), character color difference value VCb(c), and character color difference value VCr(c) are not extracted is left. When the result is Yes, the control returns to step S1404, the processings at step S1404 to step S1406 are repeated to extract the character brightnesses VY(c), the character color difference values VCb (c), and the character color difference values VCr(c) of all the pixels Pc(x, y) to be moved, and then, the result of the determination is No at this step. Then, the control proceeds to the next character deleting subroutine #1000.

The character deleting subroutine #1000 is the character deleting subroutine #1300 shown in FIG. 22 from which step S1302 of reading the character pixel coordinate information Cp and the character frame information Fc is deleted. In the character deleting subroutine #1000, instead of the deleted step S1302, the character deleting processing is performed based on the character pixel coordinate information Cp and the character frame information Fc read at step S1402. The processed brightness signal YT, the processed color difference Cb signal CbT, and the processed color difference Cr signal CrT where the character pixel Pc(x, y) to be moved is deleted are generated (S1312). Then, the control proceeds to the next step S1410.

At step S1410, the pixel P(x, y) to which the character information Ic is to be moved is selected. The destination pixel P(x, y) corresponds to the character pixel Pc(x, y), to be moved, selected at step S1404 which character pixel Pc(x, y) is moved by a predetermined distance. Then, the control proceeds to the next step S1412.

At step S1412, the brightness VY, the color difference value VCb, and the color difference value VCr of the pixel P(x, y) selected at step S1410 are overwritten with the character brightness VY(c), the character color difference value VCb(c), and the character color difference value VCr(c), respectively. Then, the control proceeds to the next step S1414.

At step S1414, it is determined whether, of the pixels P(x, y) to which the character information Ic is to be moved, one whose brightness VY, color difference value VCb, and color difference value VCr are not overwritten with the character brightness VY(c), the character color difference value VCb (c), and the character color difference value VCr(c) is left. When the result is yes, the control returns to step S1410, the processings at step S1410 to step S1414 are repeated to overwrite the brightnesses VY, the color difference values VCb, and the color difference values VCr of all the destination pixels Pc(x, y), with the character brightness VY(c), the character color difference value VCb(c), and the character color difference value VCr(c), respectively, and then, the result of the determination is No at this step. Then, the control proceeds to the next step S1416.

At step S1416, the processed brightness signal Yt, the S processed color difference Cb signal CbT, and the processed color difference Cr signal Crt generated at the step S1312 described above and stored in the output memory 004 are updated with the brightness VY, the color difference value VCb, and the color difference value VCr rewritten at step S1412. Then, the updated processed brightness signal YT, processed color difference Cb signal CbT, and processed color difference Cr signal CrT are combined by the postprocessor 015 to generate the video stream SVt where the character information Ic is moved.

Figure 24:
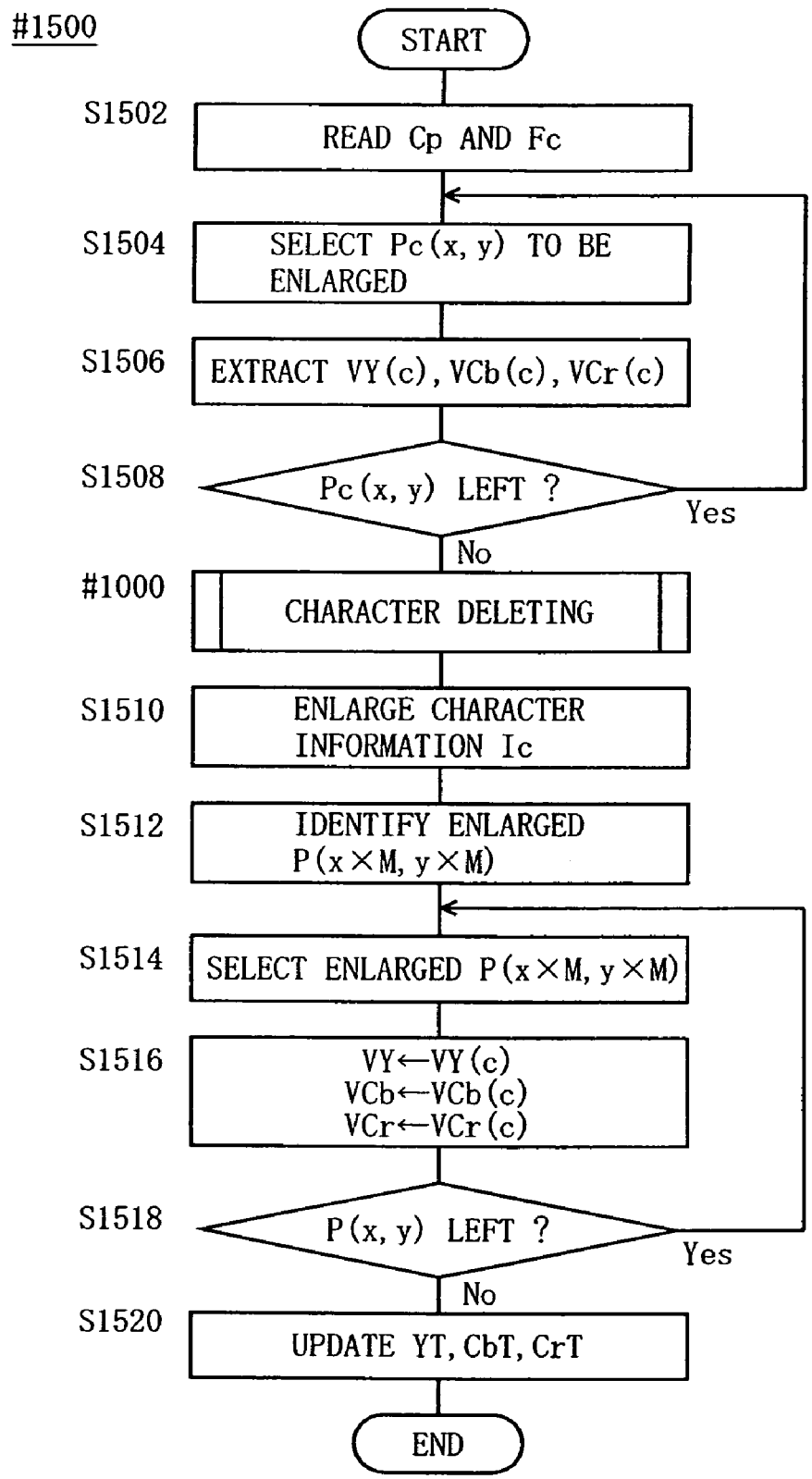
FIG. 24 is a flowchart depicting the operation of a character information enlarging subroutine shown in FIG. 20.

Next, referring to FIG. 24, the operation of the character information enlarging subroutine #1500 will be explained. The character information enlarging subroutine #1500 is an enlarging processing to display the character information Ic so as to be enlarged/reduced from the condition included in the video stream SVc, as the character processing by the character processing unit 012.

First, at step S1502, the character pixel coordinate information Cp and the character frame information Fc are read from the character display pixel table storage memory 013 and the character display frame table storage memory 014. Then, the control proceeds to step S1504.

At step S1504, the character pixel Pc(x, y) to be enlarged is selected. Then, the control proceeds to step S1506.

At step S1506, the character brightness VY(c), the character color difference value VCb(c), and the character color difference value VCr(c) of the character pixel Pc(x, y) are extracted. Then, the control proceeds to the next step S1508.

At step S1508, it is determined whether, of the character pixels Pc(x, y) to be enlarged, one whose character brightness VY(c), character color difference value VCb(c), and character color difference value VCr(c) are not extracted is left. When the result is Yes, the control returns to step S1504, the processings at step S1504 to step S1506 are repeated to extract the character brightnesses VY(c), the character color difference values VCb(c), and the character color difference values VCr(c) of all the character pixels (x, y) to be enlarged, and then, the result of the determination is No at this step. Then, the control proceeds to the next character deleting subroutine #1000.

In the character deleting subroutine #1000, the processed brightness signal YT, the processed color difference Cb signal CbT, and the processed color difference Cr signal CrT where the character pixel Pc(x, y) to be enlarged is deleted are generated (S1312). Then, the control proceeds to the next step S1510.

At step S1510, the character pixel Pc (x, y) corresponding to the character information Ic after the enlargement is obtained. Specifically, the coordinates (x, y) of the character pixel Pc(x, y) constituting the character information Ic is multiplied by an enlargement amount M to obtain the character pixel Pc(x×M, y×M) after the enlargement. The enlargement amount M is an arbitrary integer higher than 0. That is, the size of the character information Ic after the enlargement processing may be either larger or smaller than that before the enlargement. Then, the control proceeds to the next step S1512.

At step S1512, the pixel P(x×M, y×M) corresponding to the character pixel Pc (x×M, y×M) is identified. Then, the control proceeds to the next step S1514.

At step S1514, the order is determined in which the enlarging processing is performed on all the pixels P(x×M, y×M) identified at step S1512, and the pixels P(x×M, y×M) are selected one by one. Then, the control proceeds to the next step S1516.

At step S1516, the brightness VY, the color difference value VCb, and the color difference value VCr of the pixel P(x×M, y×M) selected at step S1514 are overwritten with the character brightnesses VY (c), the character color difference value VCb(c), and the character color difference value VCr(c) of the character pixel Pc(x, y) extracted at step S1506, respectively. In this way, the character information Ic is enlarged by the pixel P (x×M, y×M) having the same brightness and color difference as the original character pixel Pc(x, y). Then, the control proceeds to the next step S1518.

At step S1518, it is determined whether, of the pixels P(x×M, y×M) identified at step S1512, one whose brightness VY, color difference value VCb, and color difference value VCr are not overwritten with the character brightness VY (c), the character color difference value VCb(c), and the character color difference value VCr(c), respectively, is left. After all the pixels P(x×M, y×M) are overwritten and the character information Ic is enlarged, the control proceeds to the next step S1520.

At step S1520, the processed brightness signal YT, the processed color difference Cb signal CbT, and the processed color difference Cr signal CrT generated at step S1312 and stored in the output memory 004 are updated with the brightness VY, the color difference value VCb, and the color difference value VCr rewritten at step S1516. Then, the updated processed brightness signal VY, processed color difference Cb signal CbT, and processed color difference Cr signal CrT are combined by the postprocessor 015 to generate the video stream SVt where the character information Ic is moved.

When the enlargement amount M is smaller than 1, by the enlargement processing, one or more character pixels Pc(x, y) are expressed by one pixel P(x×M, y×M). Therefore, not only the character information Ic but also the line width is reduced. When the enlargement amount M is larger than 1, a line expressed by a plurality of adjoining character pixels Pc(x, y) is expressed by the pixels P(x×M, y×M) apart from one another by a plurality of pixels P(x, y) according to the enlargement amount M. In such a case, a line that should be expressed as one line is expressed as a collection of a plurality of thin lines apart from one another or points apart from one another, and becomes indistinct. To avoid such a situation, a step of overwriting the brightness VY, the color difference value VCb, and the color difference value VCr of the pixel P(x, y) situated between the pixel P(x×M, y×M) with the character brightness VY(c), the character color difference value VCb(c), and the character color difference value VCr (c), respectively, is provided between step S1518 and step S1520.

Figure 25:
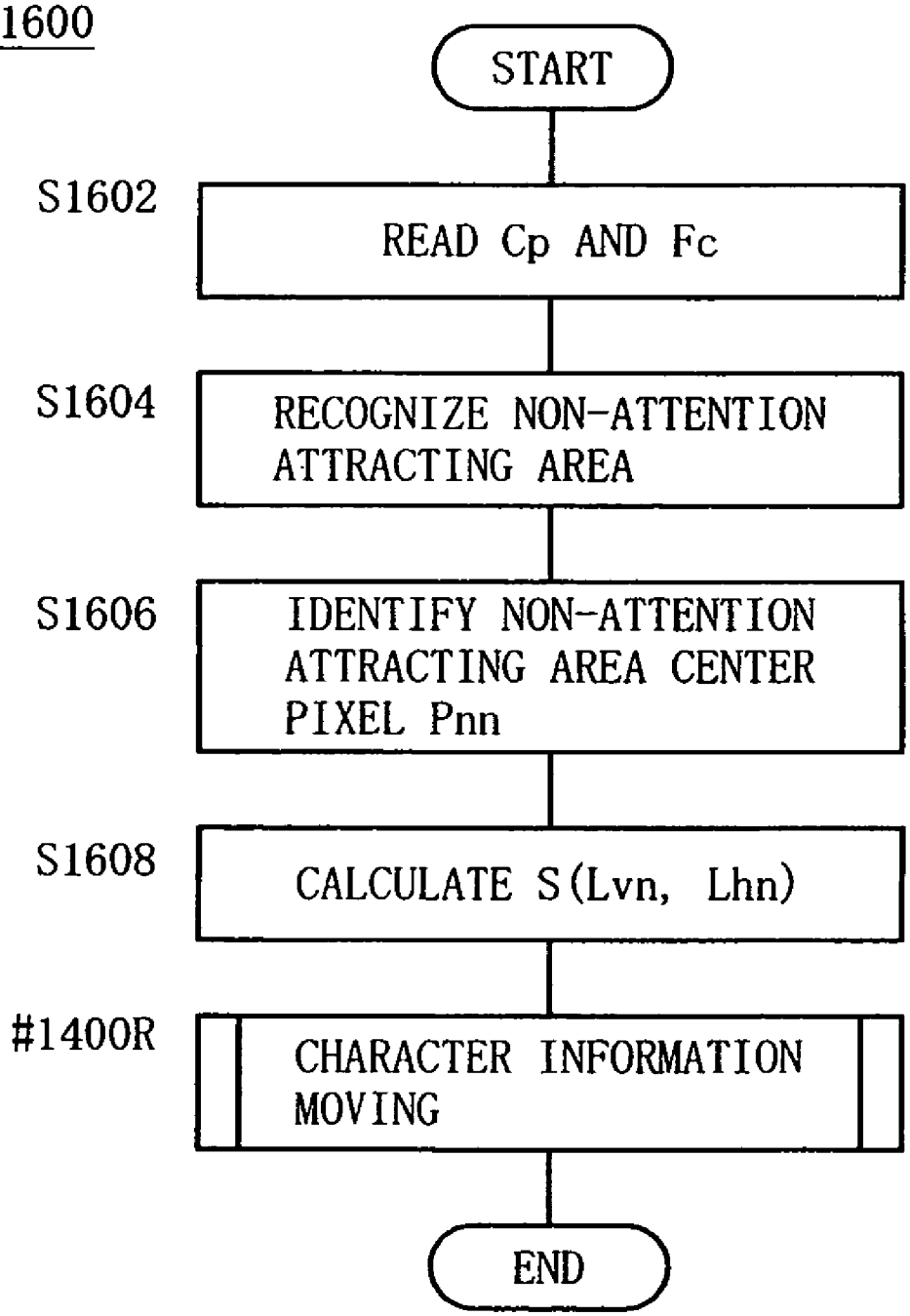
FIG. 25 is a flowchart depicting the operation of an attention attracting area avoiding subroutine shown in FIG. 20.

Next, referring to FIG. 25, the operation of the attention attracting area avoiding subroutine #1600 will be explained. The attention attracting area avoiding subroutine #1600 is a processing to, as the character processing by the character processing unit 012, automatically distinguish between the attention attracting area that attracts human attention and the non-attention attracting area that does not attract human attention and in which there are few movements such as the background in the screen image I and move the character information Ic to the non-attention attracting area. The character information Ic is moved by using the character information moving subroutine #1400. That is, for each frame of the video stream SVc, the distance between the calculated non-attention attracting area and the current character information Ic area is calculated, and the character information Ic is moved by the calculated distance.

When the attention attracting area avoiding subroutine #1600 is started, first, at step S1602, the character pixel coordinate information Cp and the character frame information Fc are read from the character display pixel table storage memory 013 and the character display frame table storage memory 014. Then, the control proceeds to the next step S1604.

At step S1604, the non-attention attracting area is recognized for each frame of the video stream SVc based on the brightness signal Y, the color difference Cb signal, and the color difference Cr signal outputted from the input memory 003. Then, the control proceeds to the next step S1606.

At step S1606, the range of the non-attention attracting area recognized at step S1604 is calculated. Preferably, the non-attention attracting area is recognized as a rectangle defined by four points. The coordinates of the pixels P(x, y) corresponding to the four points and the pixel P(x, y) corresponding to the center of the non-attention attracting area are obtained. For convenience of explanation, the pixel P(x, y) corresponding to the center of the non-attention attracting area will be called a non-attention attracting area center pixel Pnn. Then, the control proceeds to the next step S1608.

At step S1608, a non-attention attracting area horizontal movement distance Lhn and a non-attention attracting area vertical movement distance Lvn are calculated which are the average values of the distances in the horizontal direction and the distances in the vertical direction between all the character pixels Pc(x, y) registered in the character pixel coordinate information Cp and the non-attention attracting area center pixel Pnn. The movement amount S is an amount determined by the non-attention attracting area horizontal movement distance Lhn and the non-attention attracting area vertical movement distance Lvn. Then, the control proceeds to the next character information moving subroutine #1400R.

The character information moving subroutine #1400R is the character information moving subroutine #1400 shown in FIG. 23 from which step S1402 of reading the character pixel coordinate information Cp and the character frame information Fc is deleted. In the character information moving subroutine #1400R, instead of the deleted step S1402, the character information Ic is moved to the non-attention attracting area based on the character pixel coordinate information Cp and the character frame information Fc read at the step S1602 described above and the movement amount S obtained by the step S1608.

Figure 26:
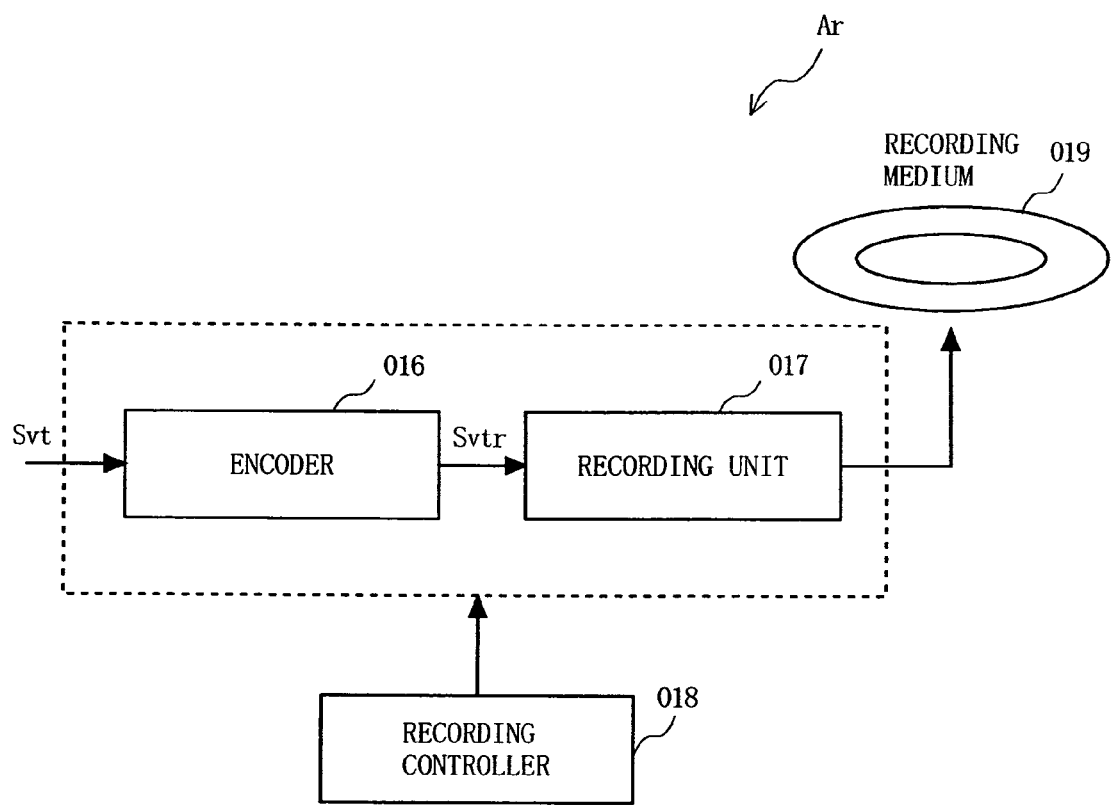
FIG. 26 is a block diagram showing the structure of a recording device in the video processing device according to the embodiment of the present invention.

Referring to FIG. 26, a recording device in the video processing device according to the embodiment of the present invention will be explained. The recording device Ar includes an encoder 016, a recording unit 017, and a recording controller 018 to realize the function of recording the video stream Svt generated by the video processing device Avp in a recording medium 019. The encoder 016 generates a recording video stream Svtr by encoding the video stream Svt inputted from the postprocessor 015 into a data format suitable for the recording in the recording medium 019. The recording unit 017 records the recording video stream Svtr into the recording medium 019. The recording controller 018 controls the operation of the entire part (the encoder 016 and the recording unit 017) of the recording device Ar.

In this case, the recording controller 018 may control the operation of the postprocessor 015 of the video processing device Avp to cause the video stream Svt to be outputted from the postprocessor 015. The recording device Ar may be formed integrally with the video processing device Avp. In this case, the system controller 030 may also perform the function of the recording controller 018.

Figure 27:
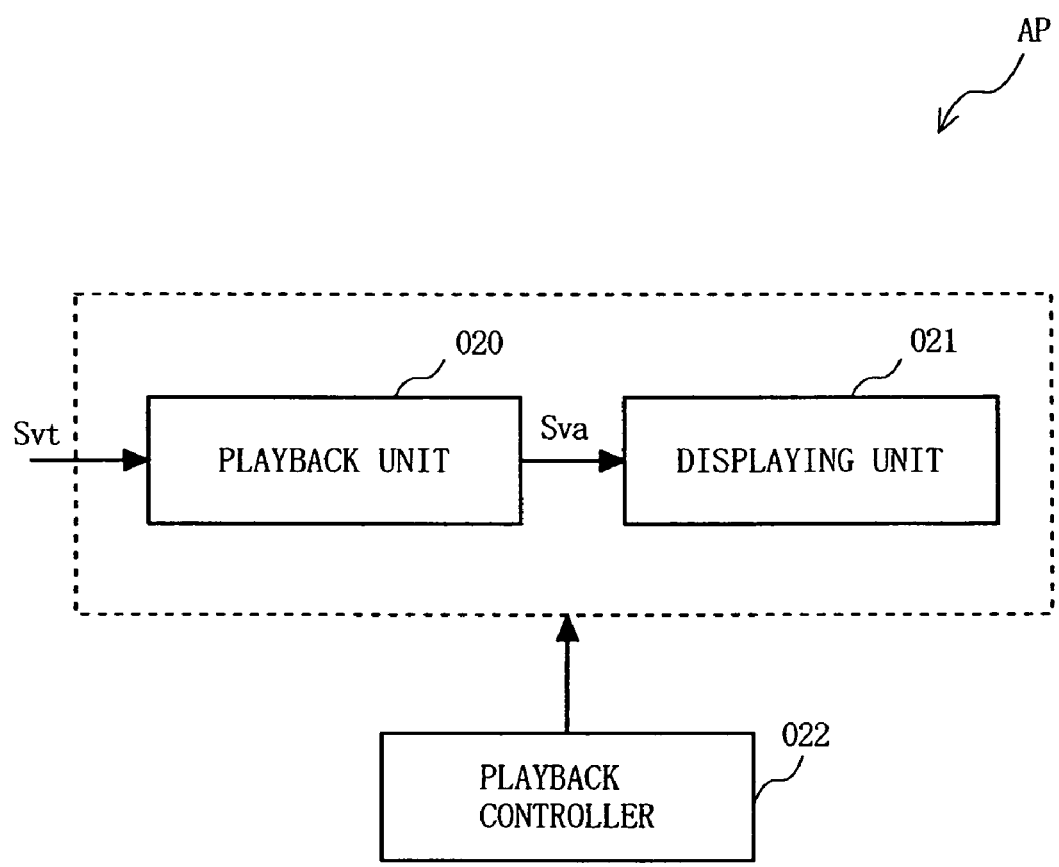
FIG. 27 is a block diagram showing the structure of a playback display device in the video processing device according to the embodiment of the present invention.

Next, referring to FIG. 27, a playback display device in the video processing device according to the embodiment of the present invention will be explained. The playback display device Ap includes a playback unit 020, a displaying unit 021, and a playback controller 022 to present the video stream Svt generated by the video processing device Avp, as an audiovisual image. The playback unit 020 generates an audiovisual signal Sav of a format suitable for the image display and the sound emission by the displaying unit 021 based on the video stream Svt inputted from the postprocessor 015. The displaying unit 021 presents an image or a sound by the audiovisual signal Sav inputted from the playback unit 020. The playback controller 022 controls the operation of the whole (the playback unit 020 and the displaying unit 021) of the playback device Ap.

In this case, the playback controller 022 may control the operation of the postprocessor 015 of the video processing device Avp to cause the video stream Svt to be outputted from the postprocessor 015. The playback device Ap may be formed integrally with the video processing device Avp. In this case, the system controller 030 may also perform the function of the playback controller 022.

INDUSTRIAL APPLICABILITY

The video processing device according to the present invention is usable for processings such as deletion, movement, and enlargement of character information such as emergency news included in a video stream, and is further applicable to recording devices such as DVD recorders and to display devices such as monitors.

The invention claimed is:

1. A video processing method of selectively processing character information included in an inputted video stream, the video processing method comprising:
    a video stream separating step of separating the video stream into a brightness frame representing brightness information and a plurality of color difference frames representing color difference information;
    a character recognizing step of recognizing the included character information based on at least either of the brightness information and the color difference information; and
    a character processing step of performing at least one of deletion, movement, and enlargement on the recognized character information.

2. The video processing method according to claim 1, wherein the character recognizing step comprises:
    a brightness determining step of comparing a brightness of a pixel in the brightness frame with a threshold value;
    a character pixel recognizing step of recognizing a pixel having a brightness higher than the threshold value, as a character pixel representing the character information;
    a character pixel registering step of registering the recognized character pixel in a character display pixel table; and
    a character information frame registering step of registering a frame where at least one recognized character pixel is present, in a character display frame table; as a frame including the character information.

3. The video processing method according to claim 2, wherein the character recognizing step further comprises:
    a color difference value determining step of determining whether a color difference value of the character pixel registered in the character display pixel table is within a predetermined range; and
    a character same color recognizing step of recognizing that the character information is the same color when it is determined that the color difference value is within the predetermined range.

4. The video processing method according to claim 2, wherein the character recognizing step further comprises:
    a pixel selecting step of selecting the pixel whose brightness is compared with the threshold value, by the brightness determining step.

5. The video processing method according to claim 2, wherein the character recognizing step further comprises:
    an inter-character pixel distance calculating step of calculating separation distances between the character pixels registered in the character display pixel table;
    an average separation distance calculating step of calculating an average separation distance by averaging the calculated separation distances; and
    a non-character pixel recognizing step of deleting the character pixel whose separation distance from the adjoining character pixel is larger than the average separation distance by a predetermined distance, from the character display table.

6. The video processing method according to claim 2, wherein the character recognizing step further comprises:
    a horizontal direction character pixel continuity detecting step of detecting continuity, in a horizontal direction, of the character pixel registered in the character display pixel table;
    a vertical direction character pixel continuity detecting step of detecting continuity, in a vertical direction, of the character pixel registered in the character display pixel table; and
    a character line width recognizing step of recognizing a character line width based on the continuity in the horizontal direction and the continuity in the vertical direction.

7. The video processing method according to claim 2, wherein the character recognizing step further comprises:
    a peripheral pixel color difference value determining step of determining whether the color difference values of peripheral pixels of the character pixel registered in the character display pixel table are uniform; and
    an edge recognizing step of recognizing that the character information is edged with a uniform color when it is determined that the color difference values of the peripheral pixels are uniform.

8. The video processing method according to claim 2, wherein the character recognizing step further comprises:
    a character information occurrence period detecting step of detecting an occurrence period of the character information registered in the character display frame table;
    a character information non-occurrence period detecting step of detecting a non-occurrence period of the character information registered in the character display frame table; and
    a character information blinking display recognizing step of recognizing that a display method of the character information is blinking display in which display and deletion are repeated at constant time intervals, based on the detected occurrence period and non-occurrence period.

9. The video processing method according to claim 2, wherein the character recognizing step further comprises:
- a first pixel distribution detecting step of detecting a first distribution of the character pixel in an arbitrary first frame on a time axis, based on the character display pixel table and the character display frame table;
- a second pixel distribution detecting step of detecting a second distribution of the character pixel in an arbitrary second frame on a different time axis from the first frame, based on the character display pixel table and the character display frame table;
- a third pixel distribution detecting step of detecting a third distribution of the character pixel on an arbitrary time axis between the first frame and the second frame, based on the first distribution;
- a distribution difference detecting step of detecting a difference between the second distribution and the third distribution; and
- a moving display recognizing step of recognizing that a display method of the character information is moving display in which the character information moves at a constant speed, based on the difference.

10. The video processing method according to claim 2, further comprising:
- a pixel value interpolating step of linearly interpolating a brightness and a color difference value of the character pixel registered in the character display pixel table, based on the brightness and the color difference value of the pixel adjoining the character pixel; and
- a frame signal correcting step of overwriting the brightness signal and the color difference signal of the character pixel with the linearly interpolated brightness and color difference value, wherein the character information is deleted from the overwritten brightness signal and color difference signal.

11. The video processing method according to claim 2, further comprising:
- a pixel value interpolating step of interpolating the brightness and the color difference value of the character pixel registered in the character display pixel table in the frame registered in the character display frame table, by the brightness and the color difference value of the corresponding pixel in a frame, close in time, not registered in the character display frame table; and
- a frame signal correcting step of overwriting the brightness signal and the color difference signal of the character pixel with the interpolated brightness and color difference value, wherein the character information is deleted from the overwritten brightness signal and color difference signal.

12. The video processing method according to claim 9, further comprising: a pixel value interpolating step of interpolating the brightness and the color difference value of the character pixel registered in the character display pixel table in the frame registered in the character display frame table, by the brightness and the color difference value (VCb, of the corresponding pixel a frame, close in time, not registered in the character display frame table; and
- a frame signal correcting step of overwriting the brightness signal and the color difference signal of the character pixel with the interpolated brightness and color difference value, wherein the character information is deleted from the overwritten brightness signal and color difference signal.

13. The video processing method according to claim 2, further comprising:
- a pixel value interpolating step of linearly interpolating the brightness and the color difference value of the character pixel registered in the character display pixel table, based on the brightness and the color difference value of the pixel adjoining the character pixel;
- a frame signal correcting step of overwriting the brightness signal and the color difference signal of the character pixel with the linearly interpolated brightness and color difference value;
- a character pixel after movement position determining step of obtaining a position of the character pixel registered in the character display pixel table when the character pixel is moved by a predetermined distance;
- an after movement pixel determining step of determining the pixel corresponding to the determined after movement position; and
- a destination pixel value changing step of overwriting the brightness and the color difference value of the determined pixel, with the brightness and the color difference value of the character pixel, respectively, wherein the character information is moved by a predetermined distance.

14. The video processing method according to claim 2, further comprising:
- a pixel value interpolating step of interpolating the brightness and the color difference value of the character pixel registered in the character display pixel table in the frame registered in the character display frame table, by the brightness and the color difference value of the corresponding pixel in a frame, close in time, not registered in the character display frame table, respectively;
- a frame signal correcting step of overwriting the brightness signal and the color difference signal of the character pixel with the interpolated brightness and color difference value;
- a character pixel after movement position determining step of obtaining a position of the character pixel registered in the character display pixel table when the character pixel is moved by a predetermined distance;
- an after movement pixel determining step of determining the pixel corresponding to the determined after movement position; and
- a destination pixel value changing step of overwriting the brightness and the color difference value of the determined pixel, with the brightness and the color difference value of the character pixel, respectively, wherein the character information is moved by a predetermined distance.

15. The video processing method according to claim 2, further comprising:
- a pixel value interpolating step of linearly interpolating the brightness and the color difference value of the character pixel registered in the character display pixel table, based on the brightness and the color difference value of the pixel adjoining the character pixel;
- a frame signal correcting step of overwriting the brightness signal and the color difference signal of the character pixel with the linearly interpolated brightness and color difference value;
- an enlarging step of enlarging coordinate values of the character pixel by a predetermined enlargement amount;
- an after movement pixel determining step of determining the pixel corresponding to the enlarged position; and
- an enlarged pixel value changing step of overwriting the brightness and the color difference value of the determined pixel with the brightness and the color difference value of the character pixel, wherein the character information is enlarged by the enlargement amount.

16. The video processing method according to claim 2, further comprising:
a pixel value interpolating step of interpolating a brightness and a color difference value of the character pixel registered in the character display pixel table in the frame registered in the character display frame table, by the brightness and the color difference value of the corresponding pixel in a frame, close in time, not registered in the character display frame table, respectively;
a frame signal correcting step of overwriting the brightness signal and the color difference signal of the character pixel with the interpolated brightness and color difference value;
an enlarging step of enlarging coordinate values of the character pixel by a predetermined enlargement amount;
an after movement pixel determining step of determining the pixel corresponding to the enlarged position; and
an enlarged pixel value changing step of overwriting the brightness and the color difference value of the determined pixel with the brightness and the color difference value of the character pixel, respectively, wherein the character information is enlarged by the enlargement amount.

17. The video processing method according to claim 2, further comprising:
a pixel value interpolating step of linearly interpolating the brightness and the color difference value of the character pixel registered in the character display pixel table, based on the brightness and the color difference value of the pixel adjoining the character pixel, respectively;
a frame signal correcting step of overwriting the brightness signal and the color difference signal of the character pixel with the linearly interpolated brightness and color difference value;
a non-attention attracting area recognizing step of recognizing a non-attention attracting area in the video stream;
a separation distance detecting step of calculating a separation distance between the non-attention attracting area and the character information;
a character pixel after movement position determining step of obtaining a position of the character pixel when the character pixel is moved by the separation distance;
an after movement pixel determining step of determining the pixel corresponding to the determined after movement position; and
a destination pixel value changing step of overwriting the brightness and the color difference value of the determined pixel, with the brightness and the color difference value of the character pixel, respectively, wherein the character information is moved by a predetermined distance.

18. The video processing method according to claim 2, further comprising:
a pixel value interpolating step of interpolating a brightness and a color difference value of the character pixel registered in the character display pixel table in the frame registered in the character display frame table, by the brightness and the color difference value of the corresponding pixel in a frame, close in time, not registered in the character display frame table, respectively;
a frame signal correcting step of overwriting the brightness signal and the color difference signal of the character pixel with the interpolated brightness and color difference value;
a non-attention attracting area recognizing step of recognizing a non-attention attracting area in the video stream;
a separation distance detecting step of calculating a separation distance between the non-attention attracting area and the character information;
a character pixel after movement position determining step of obtaining a position of the character pixel when the character pixel is moved by the separation distance;
an after movement pixel determining step of determining the pixel corresponding to the determined after movement position; and
a destination pixel value changing step of overwriting the brightness and the color difference value of the determined pixel, with the brightness and the color difference value of the character pixel, respectively, wherein the character information is moved by a predetermined distance.

19. A video processing device that selectively processes character information included in an inputted video stream, the video processing device comprising:
video stream separating means for separating the video stream into a brightness frame representing brightness information in units of frame and a plurality of color difference frames representing color difference information;
character recognizing means for recognizing the included character information based on at least either of the brightness information and the color difference information; and
character processing means for performing at least one of deletion, movement, and enlargement on the recognized character information.

20. The video processing device according to claim 19, wherein the character recognizing means comprises:
brightness determining means for comparing a brightness of a pixel in the brightness frame with a threshold value;
character pixel recognizing means for recognizing a pixel having a brightness higher than the threshold value, as a character pixel representing the character information;
character pixel registering means for registering the recognized character pixel in a character display pixel table; and
character information frame registering means for registering a frame where at least one recognized character pixel is present, in a character display frame table as a frame including the character information.

21. The video processing device according to claim 20, wherein the character recognizing means further comprises:
color difference value determining means for determining whether a color difference value of the character pixel registered in the character display pixel table is within a predetermined range; and
character same color recognizing means for recognizing that the character information is the same color when it is determined that the color difference value is within the predetermined range.

22. The video processing device according to claim 20, wherein the character recognizing means further comprises:
pixel selecting means for selecting the pixel whose brightness is compared with the threshold value, by the brightness determining means.

23. The video processing device according to claim 20, wherein the character recognizing means further comprises:
- inter-character pixel distance calculating means for calculating separation distances between the character pixels registered in the character display pixel table;
- average separation distance calculating means for calculating an average separation distance by averaging the calculated separation distances; and
- non-character pixel recognizing means for deleting the character pixel whose separation distance from the adjoining character pixel is larger than the average separation distance by a predetermined distance, from the character display table.

24. The video processing device according to claim 20, wherein the character recognizing means further comprises:
- horizontal direction character pixel continuity detecting means for detecting continuity, in a horizontal direction, of the character pixel registered in the character display pixel table;
- vertical direction character pixel continuity detecting means for detecting continuity, in a vertical direction, of the character pixel registered in the character display pixel table; and
- character line width recognizing means for recognizing a character line width based on the continuity in the horizontal direction and the continuity in the vertical direction.

25. The video processing device according to claim 20, wherein the character recognizing means further comprises:
- peripheral pixel color difference value determining means for determining whether the color difference values of peripheral pixels of the character pixel registered in the character display pixel table are uniform; and
- edge recognizing means for recognizing that the character information is edged with a uniform color when it is determined that the color difference values of the peripheral pixels are uniform.

26. The video processing device according to claim 20, wherein the character recognizing means further comprises:
- character information occurrence period detecting means for detecting an occurrence period of the character information registered in the character display frame table;
- character information non-occurrence period detecting means for detecting a non-occurrence period of the character information registered in the character display frame table; and
- character information blinking display recognizing means for recognizing that a display method of the character information is blinking display in which display and deletion are repeated at constant time intervals, based on the detected occurrence period and non-occurrence period.

27. The video processing device according to claim 20, wherein the character recognizing means further comprises:
- first pixel distribution detecting means for detecting a first distribution of the character pixel in an arbitrary first frame on a time axis, based on the character display pixel table and the character display frame table;
- second pixel distribution detecting means for detecting a second distribution of the character pixel in an arbitrary second frame on a different time axis from the first frame, based on the character display pixel table and the character display frame table;
- third pixel distribution detecting means for detecting a third distribution of the character pixel on an arbitrary time axis between the first frame and the second frame, based on the first distribution;
- distribution difference detecting means for detecting a difference between the second distribution and the third distribution; and
- moving display recognizing means for recognizing that a display method of the character information is moving display in which the character information moves at a constant speed, based on the difference.

28. The video processing device according to claim 20, further comprising:
- pixel value interpolating means for linearly interpolating a brightness and a color difference value of the character pixel registered in the character display pixel table, based on the brightness and the color difference value of the pixel adjoining the character pixel; and
- frame signal correcting means for overwriting the brightness signal and the color difference signal of the character pixel with the linearly interpolated brightness and color difference value, wherein the character information is deleted from the overwritten brightness signal and color difference signal.

29. The video processing device according to claim 20, further comprising:
- pixel value interpolating means for interpolating the brightness and the color difference value of the character pixel registered in the character display pixel table in the frame registered in the character display frame table, by the brightness and the color difference value of the corresponding pixel in a frame, close in time, not registered in the character display frame table, respectively; and
- frame signal correcting means for overwriting the brightness signal and the color difference signal of the character pixel with the interpolated brightness and color difference value, wherein the character information is deleted from the overwritten brightness signal and color difference signal.

30. The video processing device according to claim 27, further comprising:
- pixel value interpolating means for interpolating the brightness and the color difference value of the character pixel registered in the character display pixel table in the frame registered in the character display frame table, by the brightness and the color difference value of the corresponding pixel in a frame, close in time, not registered in the character display frame table; and
- frame signal correcting means for overwriting the brightness signal and the color difference signal of the character pixel with the interpolated brightness and color difference value, wherein the character information is deleted from the overwritten brightness signal and color difference signal.

31. The video processing device according to claim 20, further comprising:
- pixel value interpolating means for linearly interpolating the brightness and the color difference value of the character pixel registered in the character display pixel table, based on the brightness and the color difference value of the pixel adjoining the character pixel;
- frame signal correcting means for overwriting the brightness signal and the color difference signal of the character pixel with the linearly interpolated brightness and color difference value;
- character pixel after movement position determining means for obtaining a position of the character pixel registered in the character display pixel table when the character pixel is moved by a predetermined distance;

after movement pixel determining means for determining the pixel corresponding to the determined after movement position; and destination pixel value changing means for overwriting the brightness and the color difference value of the determined pixel, with the brightness and the color difference value of the character pixel, respectively, wherein the character information is moved by a predetermined distance.

32. The video processing device according to claim 20, further comprising:

pixel value interpolating means for interpolating the brightness and the color difference value of the character pixel registered in the character display pixel table in the frame registered in the character display frame table, by the brightness and the color difference value of the corresponding pixel in a frame, close in time, not registered in the character display frame table;

frame signal correcting means for overwriting the brightness signal and the color difference signal of the character pixel with the interpolated brightness and color difference value;

character pixel after movement position determining means for obtaining a position of the character pixel registered in the character display pixel table when the character pixel is moved by a predetermined distance;

after movement pixel determining means for determining the pixel corresponding to the determined after movement position; and destination pixel value changing means for overwriting the brightness and the color difference value of the determined pixel, with the brightness and the color difference value of the character pixel, respectively, wherein the character information is moved by a predetermined distance.

33. The video processing device according to claim 20, further comprising:

pixel value interpolating means for linearly interpolating the brightness and the color difference value of the character pixel registered in the character display pixel table, based on the brightness and the color difference value of the pixel adjoining the character pixel, respectively;

frame signal correcting means for overwriting the brightness signal and the color difference signal of the character pixel with the linearly interpolated brightness and color difference value;

enlarging means for enlarging coordinate values of the character pixel by a predetermined enlargement amount;

after movement pixel determining means for determining the pixel corresponding to the enlarged position; and enlarged pixel value changing means for overwriting the brightness and the color difference value of the determined pixel with the brightness and the color difference value of the character pixel, respectively, wherein the character information is enlarged by the enlargement amount.

34. The video processing device according to claim 20, further comprising:

pixel value interpolating means for interpolating a brightness and a color difference value of the character pixel registered in the character display pixel table in the frame registered in the character display frame table, by the brightness and the color difference value of the corresponding pixel in a frame, close in time, not registered in the character display frame table;

frame signal correcting means for overwriting the brightness signal and the color difference signal of the character pixel with the interpolated brightness and color difference value;

enlarging means for enlarging coordinate values of the character pixel by a predetermined enlargement amount;

after movement pixel determining means for determining the pixel corresponding to the enlarged position; and enlarged pixel value changing means for overwriting the brightness and the color difference value of the determined pixel with the brightness and the color difference value of the character pixel, respectively, wherein the character information is enlarged by the enlargement amount.

35. The video processing device according to claim 20, further comprising:

pixel value interpolating means for linearly interpolating the brightness and the color difference value of the character pixel registered in the character display pixel table, based on the brightness and the color difference value of the pixel adjoining the character pixel, respectively;

frame signal correcting means for overwriting the brightness signal and the color difference signal of the character pixel with the linearly interpolated brightness and color difference value;

non-attention attracting area recognizing means for recognizing a non-attention attracting area in the video stream;

separation distance detecting means for calculating a separation distance between the non-attention attracting area and the character information;

character pixel after movement position determining means for obtaining a position of the character pixel when the character pixel is moved by the separation distance;

after movement pixel determining means for determining the pixel corresponding to the determined after movement position; and destination pixel value changing means for overwriting the brightness and the color difference value of the determined pixel, with the brightness and the color difference value of the character pixel, respectively, wherein the character information is moved by a predetermined distance.

36. The video processing device according to claim 20, further comprising:

pixel value interpolating means for interpolating a brightness and a color difference value of the character pixel registered in the character display pixel table in the frame registered in the character display frame table, by the brightness and the color difference value of the corresponding pixel in a frame, close in time, not registered in the character display frame table;

frame signal correcting means for overwriting the brightness signal and the color difference signal of the character pixel with the interpolated brightness and color difference value;

non-attention attracting area recognizing means for recognizing a non-attention attracting area in the video stream;

separation distance detecting means for calculating a separation distance between the non-attention attracting area and the character information;

character pixel after movement position determining means for obtaining a position of the character pixel when the character pixel is moved by the separation distance;

after movement pixel determining means for determining the pixel corresponding to the determined after movement position; and destination pixel value changing means for overwriting the brightness and the color difference value of the determined pixel, with the brightness and the color difference value of the character pixel, respectively, wherein the character information is moved by a predetermined distance.

37. A video playback device comprising playback means for playing back a video stream processed by the video processing device according to claim 20.

38. A video playback display device according to claim 37, further comprising presenting means for presenting an audio-visual image based on the played back video stream.

39. A video recording device having recording means for recording a video stream processed by the video processing device according to claim 20.

* * * * *